United States Patent
Ohyama et al.

(10) Patent No.: US 9,571,821 B2
(45) Date of Patent: Feb. 14, 2017

(54) STEREOSCOPIC IMAGE DISPLAYING DEVICE, OBJECT PROXIMITY DETECTING DEVICE, AND ELECTRONIC APPARATUS

(75) Inventors: Tsuyoshi Ohyama, Tokyo (JP); Tsutomu Tanaka, Kanagawa (JP); Masato Imai, Aichi (JP)

(73) Assignee: Japan Display, Inc., Tokyo (JP)

( * ) Notice: Subject to any disclaimer, the term of this patent is extended or adjusted under 35 U.S.C. 154(b) by 543 days.

(21) Appl. No.: 12/789,227

(22) Filed: May 27, 2010

(65) Prior Publication Data
US 2010/0328438 A1  Dec. 30, 2010

(30) Foreign Application Priority Data
Jun. 30, 2009  (JP) .................................. 2009-155376

(51) Int. Cl.
| | | |
|---|---|---|
| *H04N 13/04* | (2006.01) | |
| *G02B 27/22* | (2006.01) | |
| *G06F 3/041* | (2006.01) | |
| *G06F 3/042* | (2006.01) | |
| *G06F 3/044* | (2006.01) | |
| *G06F 3/12* | (2006.01) | |

(52) U.S. Cl.
CPC ....... *H04N 13/0411* (2013.01); *G02B 27/2214* (2013.01); *G06F 3/042* (2013.01); *G06F 3/044* (2013.01); *G06F 3/0412* (2013.01); *H04N 13/0409* (2013.01); *H04N 13/0454* (2013.01); *H04N 13/0456* (2013.01)

(58) Field of Classification Search
CPC .................. G06F 3/0421; G06F 3/0488; G06F 2203/04108; H04N 13/0497; H04N 13/0404; H04N 13/0409; H04N 13/0422; G02B 27/2214

USPC ......................................................... 348/51
See application file for complete search history.

(56) References Cited

U.S. PATENT DOCUMENTS 5,640,273 A   6/1997  Hamagishi et al.
5,892,491 A   4/1999  Fukatsu
(Continued)

FOREIGN PATENT DOCUMENTS

JP    07-322305      12/1995
JP    2004-272354    8/1996
(Continued)

OTHER PUBLICATIONS

Kenji et al., "Vision-Based Detection of Finger Touch for Haptic Device Using Transparent Flexible Sheet", 2009 IEEE Int Conf. On Robotics and Automation, May 12, 2009.
(Continued)

*Primary Examiner* — Obafemi Sosanya
(74) *Attorney, Agent, or Firm* — Robert Depke; The Chicago Technology Law Group

(57) ABSTRACT

A stereoscopic image displaying device includes an outer surface that a detection target object approaches; a stereoscopic image generating unit that generates a three-dimensional stereoscopic image based on an input video signal, and a proximity sensor unit that is disposed on a side of the outer surface that is opposite to a side that the detection target object approaches and detects proximity of the detection target object to the outer surface based on a height that is a distance from the outer surface and is set based on parallax information included in the video signal.

15 Claims, 26 Drawing Sheets

(56) References Cited

U.S. PATENT DOCUMENTS

| | | | |
|---|---|---|---|
| 2007/0008617 A1* | 1/2007 | Shestak | G02B 27/2214 359/455 |
| 2007/0198141 A1* | 8/2007 | Moore | 701/3 |
| 2008/0030428 A1 | 2/2008 | Tomisawa et al. | |
| 2008/0074400 A1* | 3/2008 | Gettemy | G06F 1/1622 345/173 |
| 2008/0122798 A1* | 5/2008 | Koshiyama et al. | 345/173 |
| 2008/0225015 A1* | 9/2008 | Hashida | G06F 3/0418 345/173 |
| 2009/0122007 A1 | 5/2009 | Tsuzaki et al. | |
| 2009/0245591 A1* | 10/2009 | Rowe | G06K 9/2018 382/115 |
| 2009/0278805 A1 | 11/2009 | Kao | |
| 2009/0289914 A1* | 11/2009 | Cho | G06F 3/044 345/173 |
| 2009/0313584 A1* | 12/2009 | Kerr | G06F 3/012 715/849 |
| 2009/0322498 A1* | 12/2009 | Yun | G06F 3/016 340/407.2 |
| 2010/0177113 A1* | 7/2010 | Gay | G02B 27/2214 345/589 |
| 2010/0241999 A1* | 9/2010 | Russ et al. | 715/863 |

FOREIGN PATENT DOCUMENTS

| | | |
|---|---|---|
| JP | 2004-280496 | 10/2004 |
| JP | 2009-008837 | 1/2009 |
| JP | 2009-116769 | 5/2009 |
| TW | 2007-9023 | 3/2007 |

OTHER PUBLICATIONS

Peterka et al., "Advances in the Dynallax Solid-State Dynamic Parallax Barrier Autostereoscopic Visualization Display System", IEEE Trans. on Visualization and Comp. Graphics, vol. 4 No. 3, May/Jun. 2008.

* cited by examiner

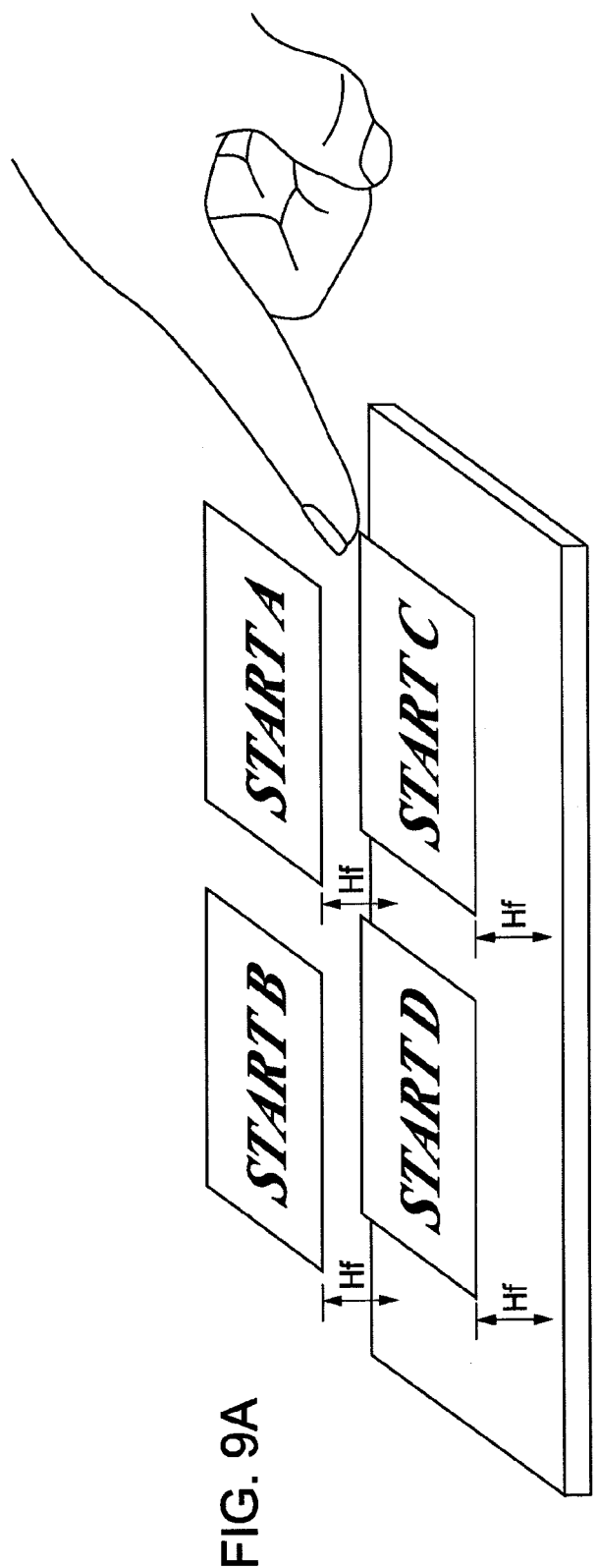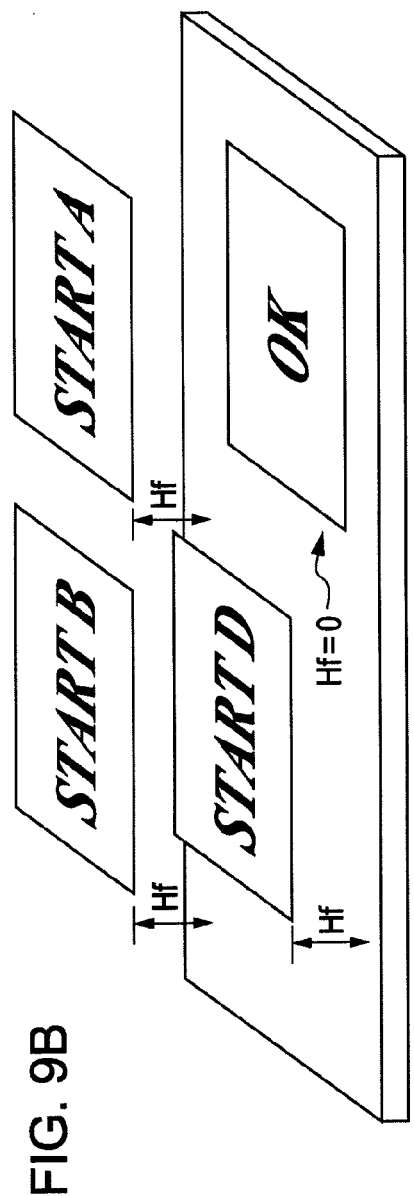
FIG. 9A
FIG. 9B

FIG. 16A
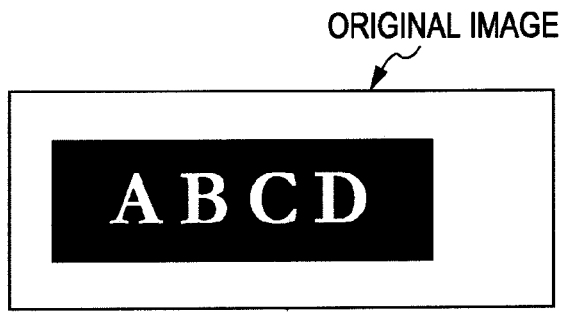
FIG. 16B
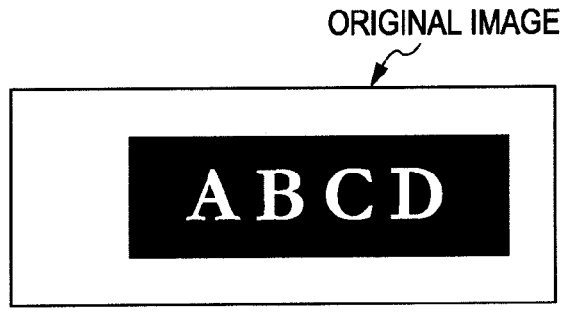
FIG. 16C1
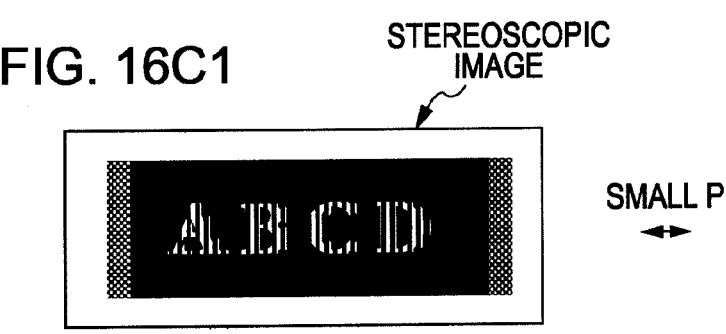
SMALL P
FIG. 16C2
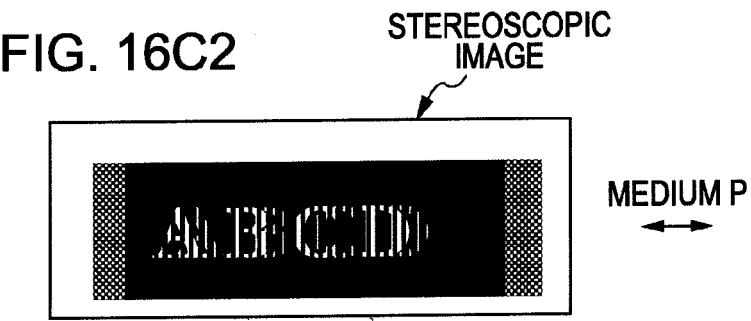
MEDIUM P
FIG. 16C3
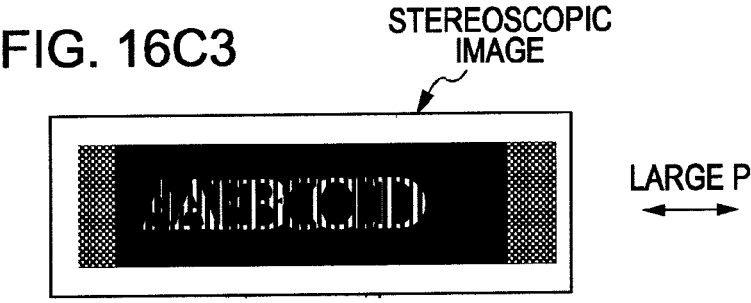
LARGE P
Hf

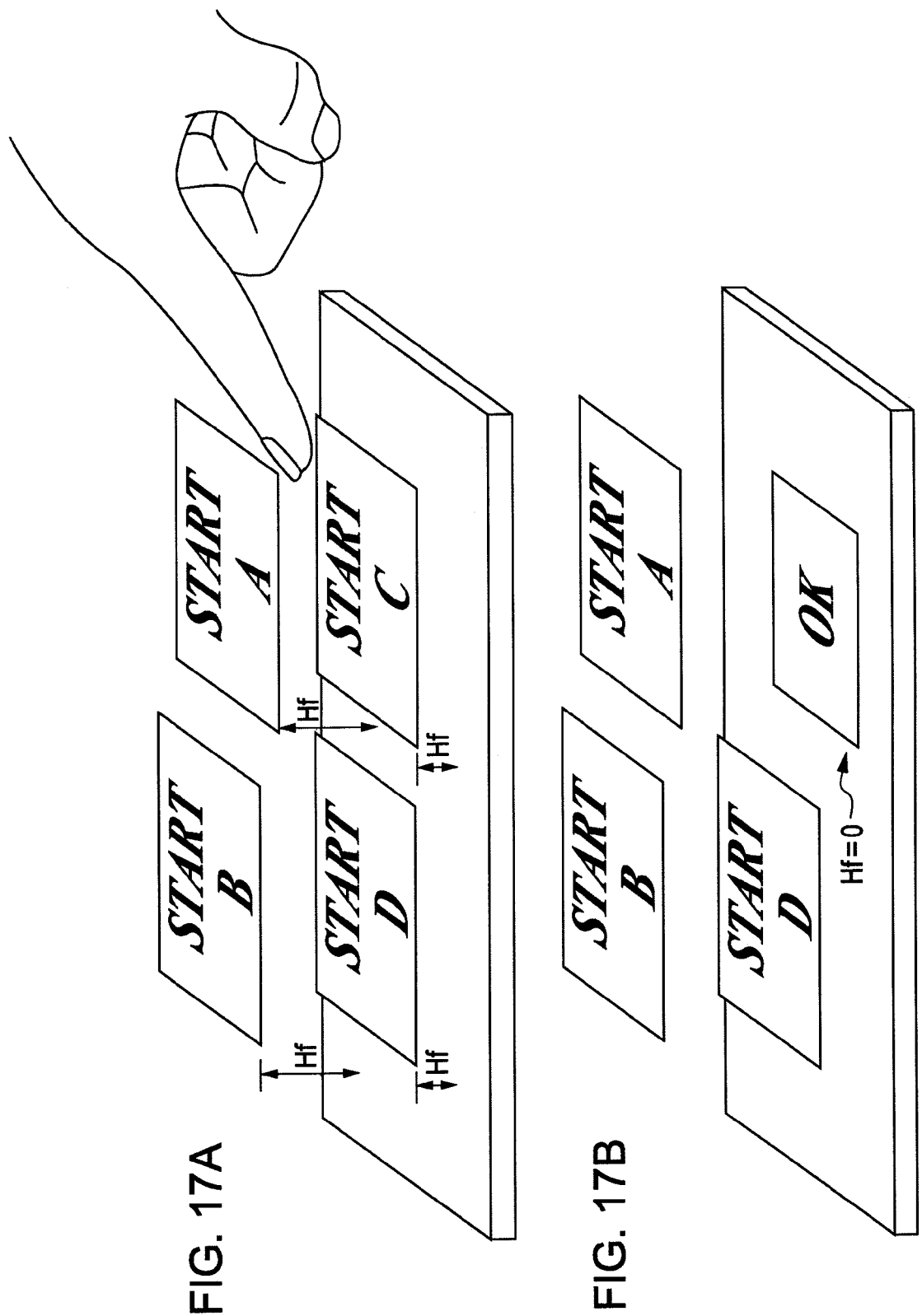

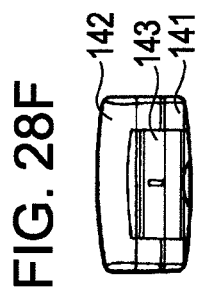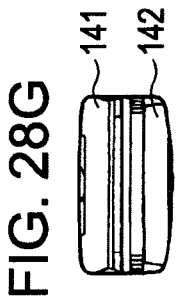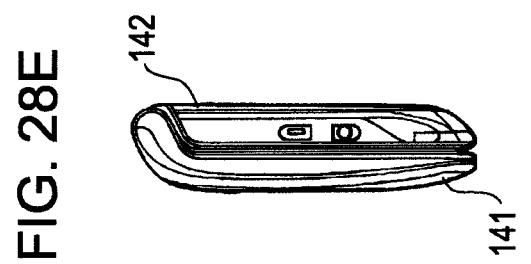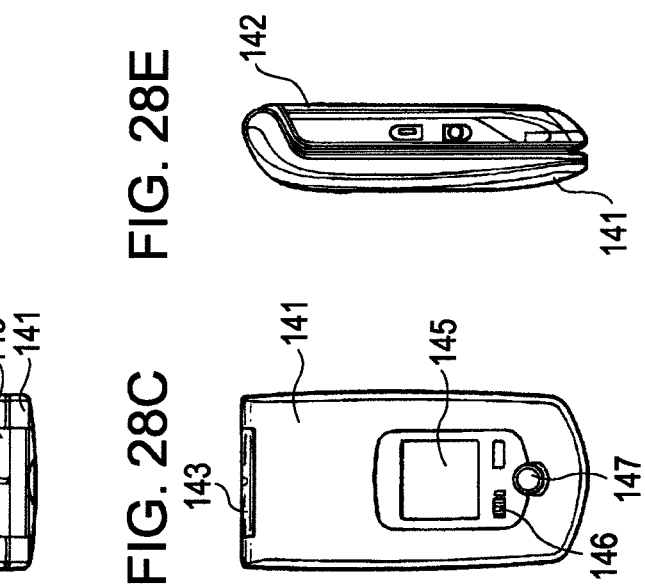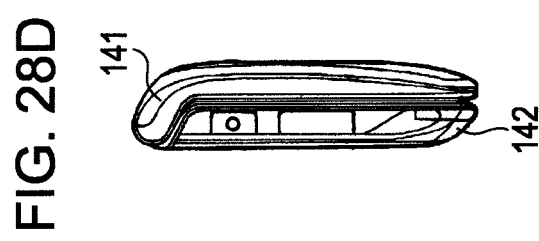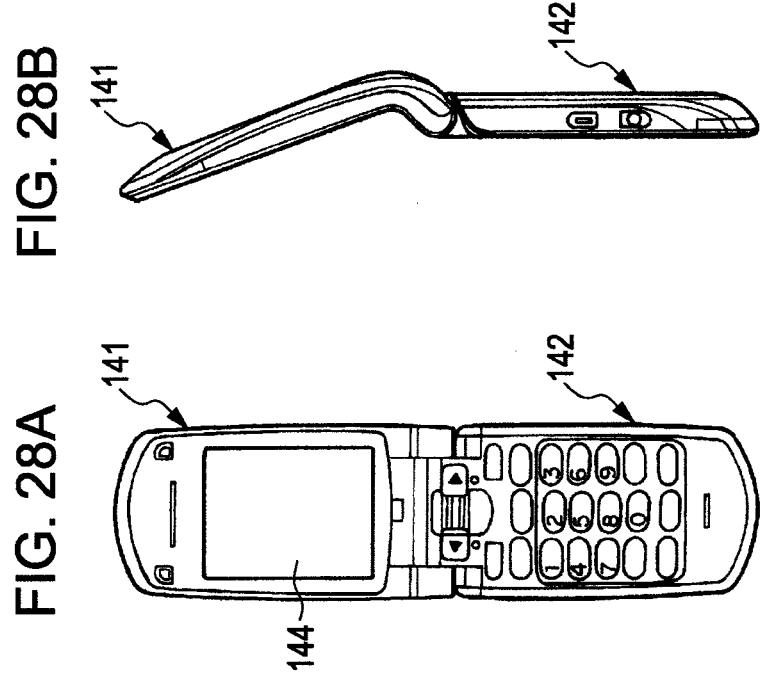

STEREOSCOPIC IMAGE DISPLAYING DEVICE, OBJECT PROXIMITY DETECTING DEVICE, AND ELECTRONIC APPARATUS

The present application claims priority to Japanese Patent Application JP 2009-1555376 filed in the Japanese Patent Office on Jun. 30, 2009, the entire content of which is hereby incorporated by reference.

BACKGROUND OF THE INVENTION

1. Field of the Invention

The present invention relates to a stereoscopic image displaying device that can display a stereoscopic image and has a proximity sensing function for detecting an operation on the stereoscopic image and the like and an electronic apparatus that has the function of displaying a stereoscopic image. In addition, the present invention relates to an object proximity detecting device capable of detecting proximity of an object.

2. Description of the Related Art

Recently, the number of liquid crystal display devices for mobile use that use touch panels for input functions has become large. In such a device, a touch panel of the electrostatic capacitance type, the resistance film type, or the optical type is disposed on the front surface of the liquid crystal display device.

In addition, there are some devices displaying a stereoscopic image that are available as products for mobile use. In a case where display is performed by using parallax, a method of arranging a light shielding portion, a method using a lenticular lens, or the like may be used. The technology of displaying a stereoscopic image by using parallax is disclosed, for example, in Japanese Patent No. 3,101,521.

In addition, operation devices such as touch panels that input information in accordance with image information after displaying a stereoscopic image have been reviewed (for example, see Japanese Unexamined Patent Application Publication No. 2004-272354, Japanese Unexamined Patent Application Publication No. 8-161987, and PCT Publication No. WO06/035816).

SUMMARY OF THE INVENTION

The invention described in Japanese Unexamined Patent Application Publication No. 2004-272354 has a configuration that reacts to an operation of a button included in an image, which is stereoscopically displayed, and changes the content of display in response to the operation of the button. As a sensor that detects the operation of a stereoscopically displayed button, the electrostatic capacitance type is disclosed, and only "a change in the electrostatic capacitance in a horizontal line and a vertical line according to an operation is detected" is written therein.

Accordingly, the above-described invention also includes a configuration that does not react unless a user actually contacts an outer surface (the edge surface of a protection layer) on which a stereoscopic image including a button is output with his or her finger or the like. In such a case, there is some dissatisfaction in the operation. In other words, since the stereoscopic image is imaged in a space apart from the outer surface, an operation is not actually recognized unless the user pushes a stereoscopic display button further after feeling a contact with the stereoscopic display button.

On the other hand, the stereoscopic image displaying devices described in Japanese Unexamined Patent Application Publication No. 2004-272354 and Japanese Unexamined Patent Application Publication No. 8-161987 can sense the operation of a button at a position in which a stereoscopic image is displayed in a case where a display button or the like is operated on a stereoscopic image. Accordingly, there is no feeling of strangeness as in Japanese Patent No. 3,101,521.

However, in the stereoscopic image displaying devices described in Japanese Unexamined Patent Application Publication No. 2004-272354 and Japanese Unexamined Patent Application Publication No. 8-161987, a sensor is configured by a light emitting body, a light sensing body, and the like that are disposed on the periphery of the imaging position of a stereoscopic image. Accordingly, the configuration of a frame shape that holds the light emitting body and the light sensing body is necessary. Thus, in terms of the stereoscopic image displaying device, the device body is three dimensionally large. In addition, particularly, it is difficult to decrease the thickness of the stereoscopic image displaying device. Therefore, it is very difficult to build the stereoscopic image displaying device in a small-sized electronic apparatus.

It is desirable to provide a stereoscopic image displaying device capable of detecting an operation at the imaging position of a stereoscopic image and having a structure that can be easily formed to be thin and an electronic apparatus that can be miniaturized and formed to be thin by building the stereoscopic image displaying device therein. In addition, it is desirable to provide an object proximity detecting device having a structure that can be easily formed to be thin and being capable of detecting proximity of an object without incurring dissatisfaction in the operation.

According to an embodiment of the present invention, there is provided a stereoscopic image displaying device including: an outer surface that a detection target object approaches; a stereoscopic image generating unit; and a proximity sensor unit.

The stereoscopic image generating unit generates a three-dimensional stereoscopic image based on an input video signal.

The proximity sensor unit is disposed on a side of the outer surface that is opposite to a side that the detection target object approaches and detects proximity of the detection target object to the outer surface based on a height that is a distance from the outer surface that is set based on parallax information included in the video signal.

In the above-described stereoscopic image displaying device, it is preferable that the proximity sensor unit has a sensitivity characteristic of object detection that has a lower limit of a detection limit at a position that is the same as the height at which the stereoscopic image is imaged based on the parallax information or a position located to a side close to the outer surface relative to the above-described height.

According to the above-described configuration, although the proximity sensor unit can be configured to detect a contact, the proximity sensor unit detects an object (detection target object) that is in proximity to the outer surface without being brought into contact with the outer surface. At this time the proximity sensor unit detects the proximity of the detection target object to the outer surface based on a height (a distance from the outer surface) that is set based on the parallax information included in an input video signal. The position of the height may be set to a position that is the same as a height (a distance from the outer surface) at which a stereoscopic image is imaged based on the parallax information. In such a case, it is desirable that the proximity sensor unit has preferably a sensitivity characteristic of object detection that has a lower limit of a detection limit in a position that is the same as the height at which the stereoscopic image is imaged based on the parallax information or a position located on a side close to the outer surface relative to the above-described height. In a case where the proximity sensor unit has the lower limit of the detection limit in a position that is the same as the height at which the stereoscopic image is imaged based on the parallax information, at a time point when the detection target object such as a finger is placed in the position, the proximity of the detection target object is detected. In addition, as the lower limit of the detection limit is further located to the outer surface side, the detection range becomes wider, and the detection precision becomes high as much.

According to another embodiment of the present invention, there is provided an object proximity detecting device including the above-described outer surface and the above-described proximity sensor unit.

According to another embodiment of the present invention, there is provided an electronic apparatus including the above-described outer surface, the above-described stereoscopic image generating unit, and the above-described proximity sensor unit. In addition, the electronic apparatus further includes an image processing unit.

The image processing unit changes at least one of the video signal input to the image generating unit and the parallax information input to the optical component by performing an image process based on a detection result of the proximity sensor unit.

The electronic apparatus having the above-described configuration is triggered to a display change or the like that is defined by an application or the like based on the detection result of the proximity sensor unit. At this time, similarly to the above-described stereoscopic image displaying device, the electronic apparatus detects the proximity of the detection target object to the outer surface based on the height (a distance from the outer surface) that is set based on the parallax information included in an input video signal. Accordingly, according to the electronic apparatus, there is no feeling of strangeness during the operation, and the responsiveness is high (a time until the display is changed after the operation is short).

According to an embodiment of the present invention, there is provided a stereoscopic image displaying device that can detect an operation in a position in which a stereoscopic image is imaged and has a structure that can be easily formed to be thin and an electronic apparatus of which the size and the thickness can be decreased by building the stereoscopic image displaying device therein.

In addition, according to another embodiment of the present invention, there is provided an object proximity detecting device that has a structure that can be easily formed to be thin and can detect the proximity of an object without giving a user some dissatisfaction.

BRIEF DESCRIPTION OF THE DRAWINGS

FIGS. 9A and 9B are schematic diagrams showing an example of a button operation.

FIGS. 16A to 16C3 are schematic diagrams illustrating a case where parallax information is changed by one 3D display button.

FIGS. 17A and 17B are schematic diagrams before and after an operation in a case where different imaging heights are set in a plurality of buttons.

FIGS. 28A to 28G are open/closed views, plan views, side views, a top view, and a bottom view of a cellular phone.

DESCRIPTION OF THE PREFERRED EMBODIMENTS

Embodiments of the present invention will be described mainly for a liquid crystal display device used as an example of a stereoscopic display device in the following order with reference to the drawings.

1. First Embodiment: Stereoscopic Image Displaying Device of Liquid Crystal Display Type Having Electrostatic Capacitance-Type Externally Attachable Proximity Sensor Panel
2. Second Embodiment: Stereoscopic Image Displaying Device of Liquid Crystal Display Type Having Electrostatic Capacitance-Type Proximity Sensor Built therein
3. Third Embodiment: Stereoscopic Image Displaying Device of Liquid Crystal Display Type Having Optical-Type Proximity Sensor (Optical Sensor Array) Built therein.
4. Fourth Embodiment: Example of Adaptive Control of Threshold Value of Detection Range and Display Image Although this embodiment can be applied together with the first to third embodiments, here, an example of the third embodiment will be disclosed.

Figure 1:
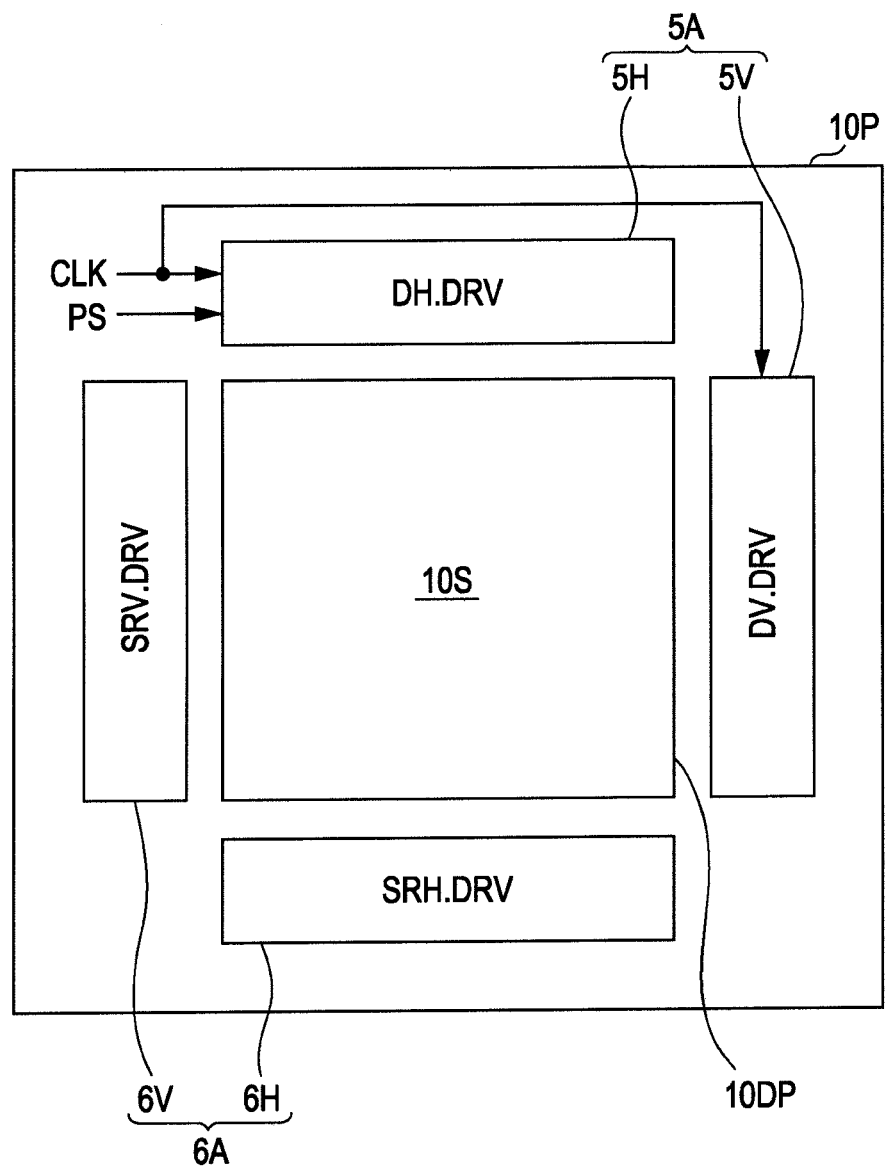
FIG. 1 is a block diagram showing a configuration example of a display panel included in a stereoscopic image display panel according to a first embodiment of the present invention.

5. Modified Example 1: Application for Optical Component of Lenticular Lens
6. Modified Example 2: Other Modified Examples
7. Application of Present Invention for Electronic Apparatus 1. First Embodiment Entire Configuration of Display Panel FIG. 1 is a block diagram showing a configuration example of a display panel included in a stereoscopic image display panel according to a first embodiment of the present invention. Although a display type, not shown in the figure, is different, and the type of a proximity sensor or a built-in type is different, the configuration shown in FIG. 1 is commonly used by a stereoscopic image displaying device according to other embodiments of the present invention.

A display panel 10P shown in FIG. 1 includes a display unit 10DP having an external attachment-type proximity sensor, to which an electrostatic capacitance-type proximity sensor unit is added, attached to the surface thereof and peripheral circuits thereof. The outermost surface of the display panel 10P is an outer surface 10S that a detection target (a fingertip, a stylus pen, or the like) according to an embodiment of the present invention approaches. The peripheral circuits include a display H driver (DH.DRV) 5H, a display V driver (DV.DRV) 5V, a sensor reading H driver (SRH.DRV) 6H, and a sensor reading V driver (SRH.DRV) 6V.

The display H driver 5H and the display V driver 5V are circuits that drive liquid crystal elements of respective pixels disposed inside the display unit 10DP in a line-sequential manner based on a video signal PS and a control clock CLK that are input.

The sensor reading V driver 6V and the sensor reading H driver 6H are circuits that acquire a sensor output signal by driving a proximity sensor unit that is disposed in a sensor region located inside the display unit 10DP.

Cross-Sectional Structure of Display Unit

Figure 2:
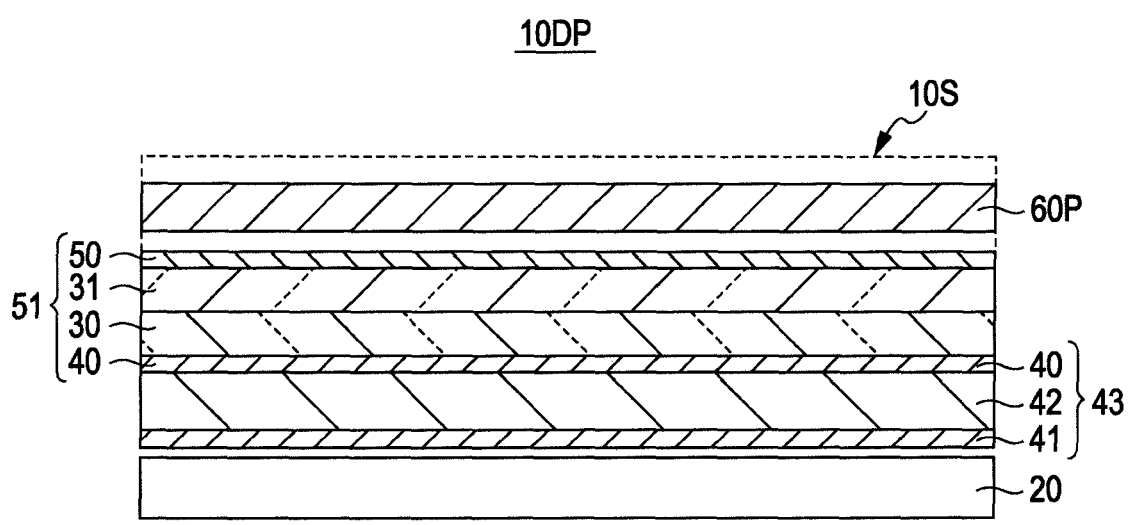
FIG. 2 is a cross-sectional structure diagram of a display unit.

FIG. 2 shows a cross-sectional structure diagram of the display unit. In the display unit 10DP shown in FIG. 2, a proximity sensor panel 60P, an optical modulation panel 51 as an image generating unit, a parallax barrier (PV) 43 as an optical component, and a back light 20 are sequentially disposed from the outer surface 10S side.

The back light 20, although not shown in detail in the figure, is an illumination device dedicated for image display that is acquired by assembling a light guiding plate, a light source such as an LED, a light source driving unit, a reflective sheet, a prism sheet, and the like as one body.

The optical modulation panel 51 has a TFT substrate 30 disposed on the back light 20 side and an opposing substrate 31 disposed on the outer surface 10S side. In the TFT substrate 30 and the opposing substrate 31, various electrodes, devices, and an optical functional layer, not shown in the figure, are formed to be appropriately planarized and appropriately insulated from each other.

Described in detail, in the principal surface of the TFT substrate 30 that is disposed on the outer surface 10S side, TFTs (thin film transistors) that are pixel electrodes and driving devices are formed in a repetitive pattern for pixels. In addition, in a case where an In-Plane Switching (IPS) display mode is employed, an opposing electrode (also referred to as a common electrode) is formed in a lower layer of the pixel electrode by being buried in a planarization film. On an upper layer of a layer in which the pixel electrodes or the TFTs are disposed, a first alignment film is formed.

In addition, on one surface (rear surface side) of the opposing substrate 31, a color filter, a planarization film, and a second alignment film are formed.

The TFT substrate 30 is bonded to the opposing substrate 31 so as to form an inner space through a spacer (not shown in the figure). At this time, the TFT substrate 30 and the opposing substrate 31 are bonded together such that the face of the TFT substrate 30 in which the pixel electrode, the TFT, and the first alignment film are formed and the face of the opposing substrate 31 in which the color filter and the second alignment film are formed to face each other. From a portion in which the spacer is not formed, liquid crystal is injected into the inner space between the two substrates. Thereafter, when the injection portion for the liquid crystal is closed, the liquid crystal is sealed inside a cell acquired by bonding the two substrates, whereby a liquid crystal layer is formed. Since the liquid crystal layer is brought into contact with the first alignment film and the second alignment film, the alignment direction of the liquid crystal molecules can be determined in the rubbing direction of the alignment films.

In the liquid crystal layer formed as described above, a pixel electrode for each pixel and an opposing electrode (common electrode) that is common among pixels are disposed so as to be adjacent to each other in the direction of the thickness of the layer. These electrodes of the two types are electrodes used for applying a voltage to the liquid crystal layer. There are a case where the two electrodes are disposed with the liquid crystal layer interposed therebetween (vertically directed driving mode) and a case where the two electrodes are disposed on the TFT substrate 30 side in two layers (horizontally directed driving mode, for example, an IPS mode). In the case of the IPS mode, the pixel electrode and the opposing electrode (common electrode) are separated so as to be insulated from each other. However, the opposing electrode disposed on the lower layer side applies an electric action to the liquid crystal from spaces between patterns of the pixel electrodes brought into contact with the liquid crystal layer on the upper layer side. Accordingly, in the horizontally directed driving mode, the direction of the electric field is the horizontal direction. On the other hand, in the case where the two electrodes are disposed with the liquid crystal layer interposed therebetween in the thickness direction thereof, the direction of the electric field is the vertically direction (thickness direction).

In a case where the electrodes are disposed in accordance with any of the driving modes, when driving of the display H driver 5H and the display V driver 5V shown in FIG. 1 is controlled, a voltage can be applied to the liquid crystal layer in a matrix pattern by the two electrodes. Accordingly, the liquid crystal layer serves as a functional layer (optical modulation layer) that optically modulates the transmission. The liquid crystal layer performs grayscale display in accordance with the magnitude of a voltage applied to the pixel electrode based on a video signal PS applied to the display H driver 5H shown in FIG. 1.

As shown in FIG. 2, to the other principal surface (rear surface) of the TFT substrate 30, a first polarizing plate 40 is attached. In addition, a second polarizing plate 50 forming a pair together with the first polarizing plate 40 is attached to the surface of the opposing substrate 31 that is disposed on the outer surface 10S side.

Between the second polarizing plate 50 and the outer surface 10S, a proximity sensor panel 60P is disposed. The surface of the proximity sensor panel 60P that is disposed opposite to the optical modulation panel 51 is covered with a protection layer, and the uppermost surface of the proximity sensor panel 60P becomes the outer surface 10S through which an image transmitted from the outside is recognized and which a detection target object approaches.

In addition, detailed description of the structure of the parallax barrier 43 shown in FIG. 2 will be presented later with reference to a more detailed diagram.

Configuration of Proximity Sensor Panel

Figure 3A:
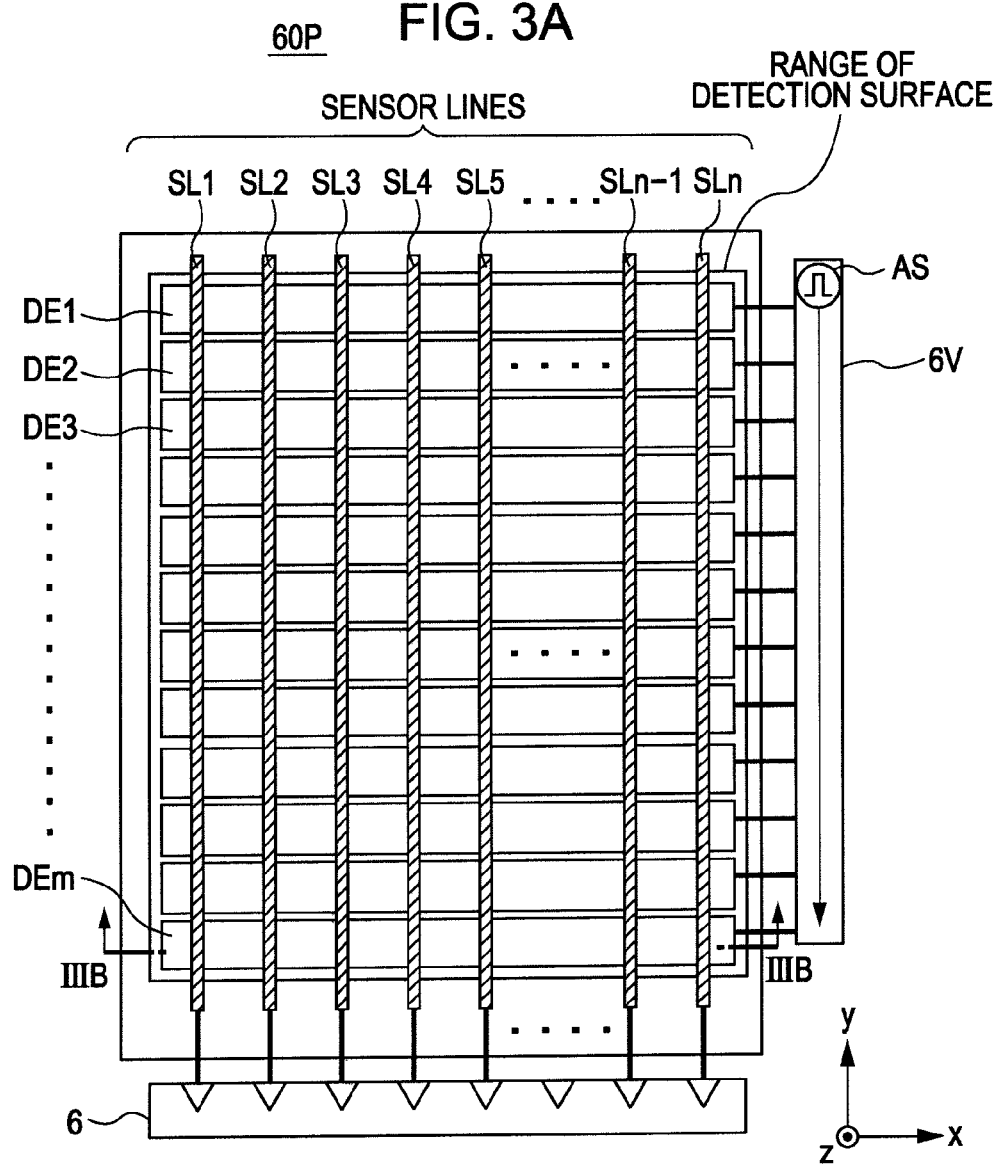
FIGS. 3A and 3B are a schematic plan view of a proximity sensor panel and a cross-sectional structure diagram of the inside of the panel.
Figure 3B:
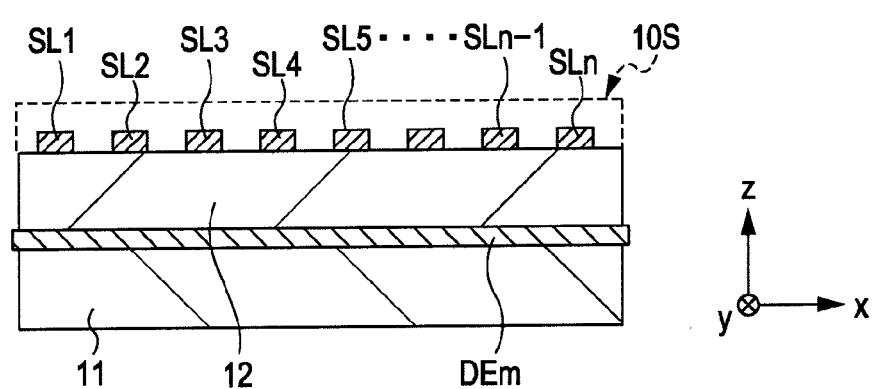

FIG. 3A shows a schematic plan view of the proximity sensor panel. FIG. 3A is a diagram acquired by seeing through the inside of the panel from the outer surface 10S side shown in FIG. 2. In addition, FIG. 3B shows a schematic cross-sectional view taken along line IIIB-IIIB shown in FIG. 3A. As shown in FIG. 3B, in the proximity sensor panel 60P, a driving electrode DEm is disposed between a first sensor substrate 61 and a second sensor substrate 62. On the surface of the second sensor substrate 62 that is disposed opposite to the driving electrode DEm side, that is, on the surface thereof that is disposed on the outer surface side, n sensor lines SL1 to SLn are disposed. The n sensor lines SL1 to SLn serve as detection electrodes of which the electric potentials change in accordance with the proximity of a detection target object.

The n sensor lines SL1 to SLn, as shown in FIG. 3A, are formed by a plurality of wires elongated in the direction y. Hereinafter, arbitrary one of the sensor lines SL1 to SLn is denoted by a sensor line SLi (i=1, 2, 3, . . . , n).

In addition, m driving electrodes, as shown in FIG. 3A, are respectively formed in a long band shape elongated in the direction x and are disposed in the direction y with a same pitch. The m driving electrodes DEj (j=1, 2, 3, . . . , m) is disposed in a direction different from that of the n sensor lines SL1 to SLn. In this example, the driving electrode DEj and the sensor line SLi are disposed so as to be perpendicular to each other.

The materials of the first sensor substrate 61 and the second sensor substrate 62, which are shown in FIG. 3B, are not particularly limited. However, the two sensor substrates are formed by materials having optical transparency. In addition, each SLi of the n sensor lines SL1 to SLn is capacitively coupled with each DEj of the m driving electrodes DE1 to DEm. Accordingly, in the viewpoint of allowing the corresponding capacitive coupling to have predetermined strength, the thickness and the material of the second sensor substrate 62 are regulated. In such a viewpoint, an insulating material may be interposed between the n sensor lines SL1 to SLn and the m driving electrodes DE1 to DEm with the second sensor substrate 62 being omitted.

As shown in FIG. 3A, the sensor reading V driver 6V is disposed so as to be connected to one ends of the m driving electrodes DE1 to DEm. In addition, a detection determining unit 6 is disposed so as to be connected to one ends of the n sensor lines SL1 to SLn. The sensor reading V driver 6V is formed inside the proximity sensor panel 60P. However, a part of the function of the detection determining unit 6, particularly, a function of determining placement of a detection target object or the position thereof based on a read-out sensor output signal may be implemented on the outside of the proximity sensor panel 60P.

The sensor reading V driver 6V includes an AC signal source AS for each driving electrode. The sensor reading V driver 6V is a circuit that changes an activated AC signal source AS within a block of the sensor reading V driver 6V shown in FIG. 3A in a direction (scanning direction) denoted by an arrow. In other words, the sensor reading V driver 6V is a circuit that has one AC signal source AS and switches connection of the one AC signal source AS to one driving electrode DEj of the m driving electrodes in the above-described scanning direction. The sensor reading V driver 6V may be controlled in accordance with a scanning algorithm based on a control signal transmitted from the outside thereof (for example, a CPU, a pulse generating circuit, or the like that is not shown in the figure).

In addition, in this embodiment, the perpendicular disposition of the driving electrode and the sensor line is not necessary. Thus, the shape or the disposition of each sensor line and each driving electrode is not particularly limited as long as the capacitive coupling between the sensor line and the driving electrode is uniform or almost uniform within a detection surface. As shown in FIG. 3A, each sensor line is drawn out from one of two sides perpendicular to the detection surface and is connected to the detection determining unit 6. In addition, each driving electrode is drawn out from the other of the above-described two sides and is connected to the sensor reading V driver 6V. Then, the detection determining unit 6 and the sensor reading V driver 6V can be easily arranged. Accordingly, the perpendicular disposition of the driving electrode and the sensor line is preferable. However, this embodiment is not limited thereto.

Cross-Sectional Structure and Operation of Parallax Barrier

Figure 4A:
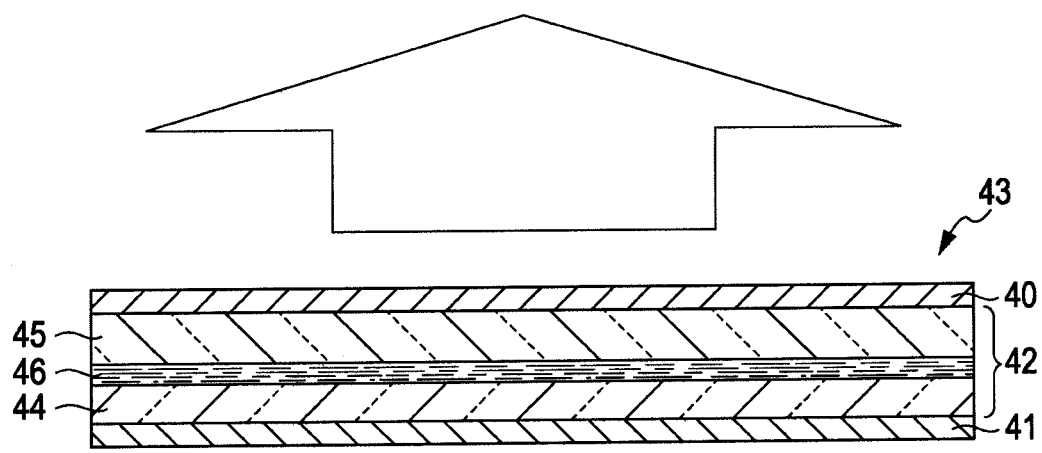
FIGS. 4A and 4B are schematic cross-sectional structure diagrams of a parallax barrier.

FIG. 4A shows a schematic cross-sectional structure of the parallax barrier. The parallax barrier 43 shown in the figure, as also shown in FIG. 2, includes the first polarizing plate 40 that is also used as a polarizing plate of the optical modulation panel 51 (FIG. 2), a third polarizing plate 41, and an optical control layer 42 disposed between the first polarizing plate 40 and the third polarizing plate 41.

The optical control layer 42, for example, serves as a switching liquid crystal and has a structure in which a switching liquid crystal layer 46 is enclosed between a first PV substrate 44 and a second PV substrate 45. After planar light emitted from the back light 20 shown in FIG. 2 is converted into a linearly polarized light by the third polarizing plate 41, the linearly polarized light is incident to the switching liquid crystal layer 46. The light transmitted from the switching liquid crystal layer 46 is absorbed or transmitted in accordance with the state of the switching liquid crystal by the first polarizing plate 40. The switching liquid crystal layer 46 has a function of partially shielding incident light based on an interaction between the third polarizing plate 41 and the first polarizing plate 40. Accordingly, a voltage applied to the switching liquid crystal layer 46 is partially turned on or off. This switching between voltages is controlled by generating existence (or a change in magnitude) of an electric potential difference between a PV driving electrode (not shown) and a PV common electrode (not shown) that are formed on one of opposing surfaces of the first PV substrate 44 and the second PV substrate 45 and the other thereof. For example, the PV driving electrodes are formed for each column (pixel column) of the pixels and are disposed in the row direction with a pitch corresponding to the arrangement of the pixels. The PV common electrode, for example, is formed in one planar shape. Both the PV driving electrode and the PV common electrode are formed from transparent electrode materials having high optical transparency. In addition, both the PV driving electrode and the PV common electrode are formed in line shapes. Accordingly, stripes can be formed vertically and horizontally (landscape and portrait). Therefore, 3D display can be performed in any position in which a display image is rotated by 90 degrees as will be described later.

Figure 4B:
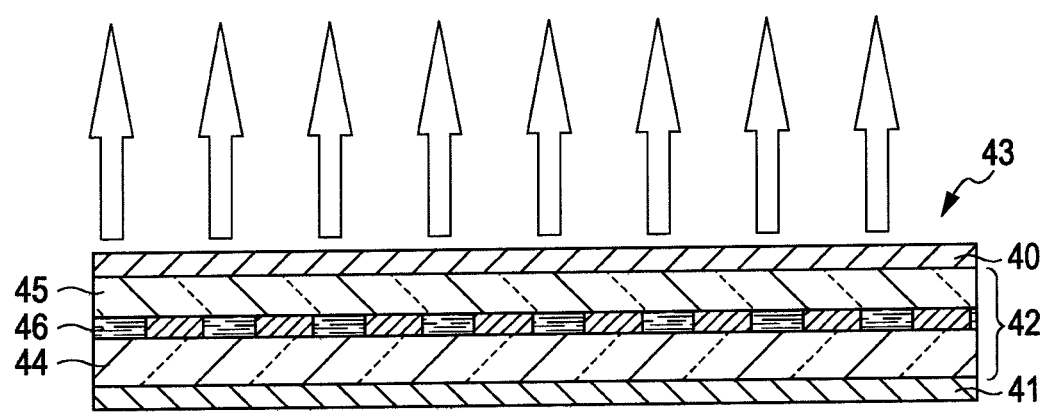

By using the above-described configuration and switching between voltages applied to the liquid crystal with the pixel pitch used as the minimal unit, the state is switched between a state shown in FIG. 4A in which planar beams corresponding to no parallax are output and a state shown in FIG. 4B in which discrete parallel stripe beams corresponding to existence of parallax is output. In the state in which parallel stripe beams are output, a portion that shields the beams is referred to as a "parallax barrier", and a portion that allows the beams to be transmitted is referred to as a "slit". In the case shown in FIG. 4A in which a two-dimensional image is displayed, the entire surface of the panel is in a white state, and accordingly, there is no large decrease in the transmittance. On the other hand, in the case of FIG. 4B in which a three dimensional image is displayed, the liquid crystal is switched to be in a line shape, and accordingly, a parallax barrier having a stripe shape that is separated by the slit is formed.

The switching between voltages applied to the liquid crystal is controlled by a "display control unit". The control operation performed by the display control unit includes control for a case where switching is performed (FIG. 4B) and control for a case where switching is not performed (FIG. 4A). In the case of FIG. 4A where switching is not performed, the optical modulation panel 51 shown in FIG. 2 is in the two-dimensional image display mode in which a two-dimensional image is displayed in accordance with supply of a video signal PS not including parallax information. On the other hand, in the case of FIG. 4B where switching is performed, the optical modulation panel 51 is in the three-dimensional image display mode in which a three-dimensional image having parallax is generated in accordance with the supply of the video signal PS including parallax information and an interaction between the light and liquid crystal switching. The display control unit can perform switching between a two-dimensional image and a three-dimensional image in both directions on the entire screen or in a part of the screen. In other words, the display control unit can convert a part of a two-dimensional display image into a three-dimensional image. In addition, on the contrary, the display control unit can convert a part of a three-dimension image into a two-dimensional image.

Furthermore, the display control unit can rotate the direction in which parallax occurs by 90 degrees in the three-dimensional image display mode. Described in detail, the display control unit rotates the direction in which parallax occurs by 90 degrees by converting parallel stripe beams elongated in the column direction into parallel stripe beams elongated in the row direction. The reason for this is for matching the direction in which parallax occurs to a direction in which two eyes are apart from each other in accordance with user's rotating the direction, in which the stereoscopic display device is visually recognized, by 90 degrees.

As the display mode of the switching liquid crystal layer 46, a twisted nematic mode having high transmittance is preferably used. However, any other display mode such as a vertical alignment mode or an in-plane switching mode can be used, as long as switching between white and black can be performed therein. In addition, as the structure of the electrodes, a simple matrix may be used. However, in a case where a part of the electrodes performs 3D display, and the position of the part is changed, an active matrix black-and-white panel can be used.

Circuit Used for Displaying Stereoscopic Image and Detecting Proximity

The operations of displaying a stereoscopic image and detecting proximity will be described on the premise that the above-described configuration is used. First, a circuit that performs control thereof will be described.

Figure 5:
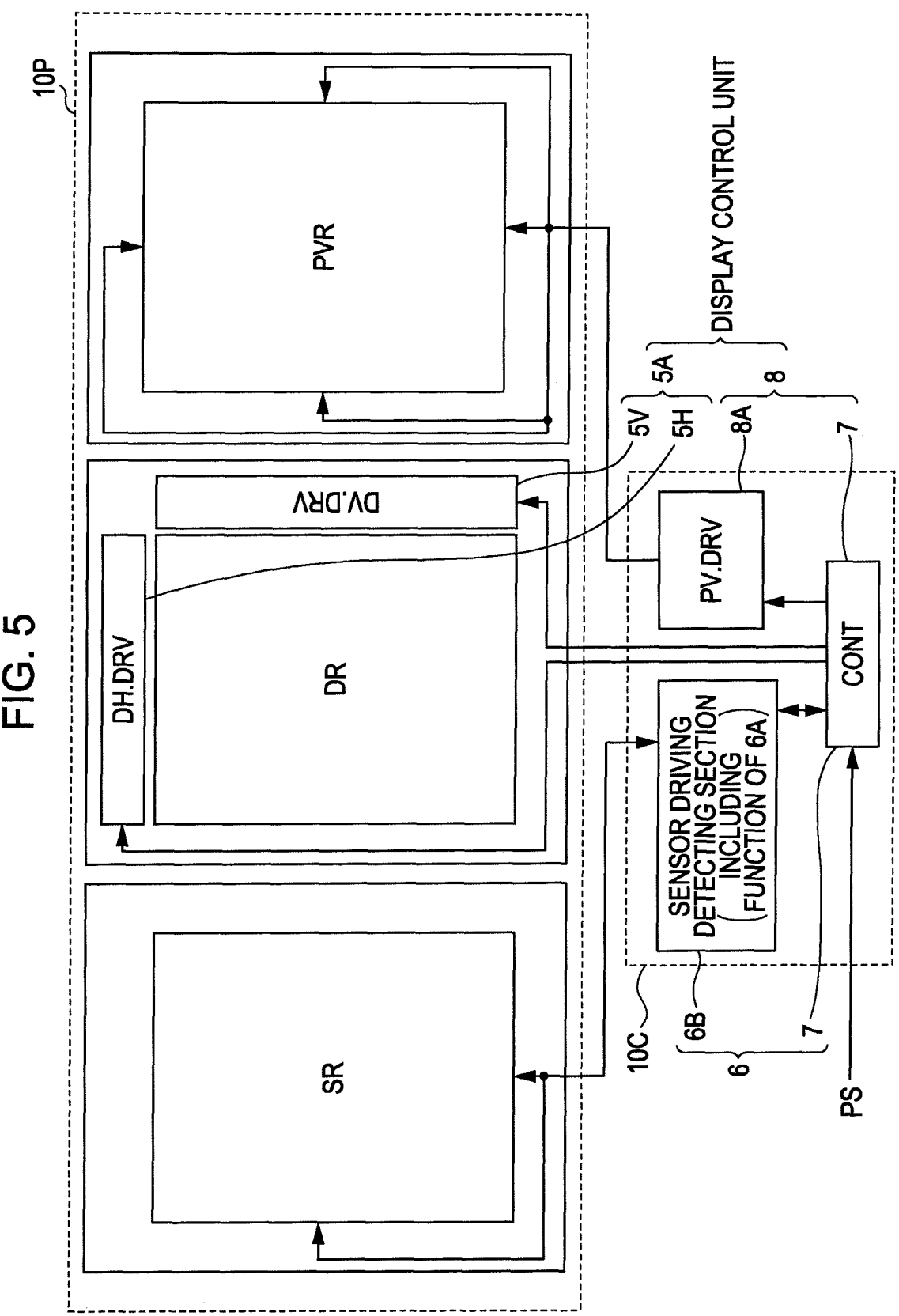
FIG. 5 is a diagram (functional block diagram) representing peripheral circuits of the inside of the display panel and other control circuits as being divided into functional blocks.

FIG. 5 is a diagram representing the peripheral circuits of the inside of the display panel 10P shown in FIG. 1 and other control circuits that are disposed inside the stereoscopic image displaying device according to this embodiment as being divided into functional blocks. Three plan views aligned in FIG. 5 show three functional hierarchies other than the back light 20 inside one display panel 10P. A functional layer denoted as a sensor region SR corresponds to the proximity sensor panel 60P shown in FIG. 2. In addition, a display region DR corresponds to the optical modulation panel 51, and a parallax barrier area PVR corresponds to the parallax barrier 43.

As the circuits controlling the driving of the three areas (functional hierarchies), there are a display driving circuit 5A that is configured by the display H driver 5H and the display V driver 5V; a sensor driving detecting section 6B; a control circuit 7 such as a CPU; and a parallax barrier driving circuit (PV.DRV) 8A.

The sensor driving detecting section 6B includes the function of the sensor driving circuit 6A that is configured by the sensor reading H driver 6H and the sensor reading V driver 6V shown in FIG. 1. In this example, the detection determining unit 6 also shown in FIG. 3A is configured by the sensor driving circuit 6A and the control circuit 7.

For example, a PV control unit 8 is configured by the parallax barrier driving circuit 8A and the control circuit 7. Furthermore, an example of the "display control unit" according to an embodiment of the present invention is configured by the PV control unit 8 and the display driving circuit 5A. In the display control unit, various control operations described in advance in the operation of the parallax barrier is performed by the PV control unit 8, and the driving of the optical modulation panel 51 is performed by the display driving circuit 5A.

Stereoscopic Image Displaying Operation

Figure 6:
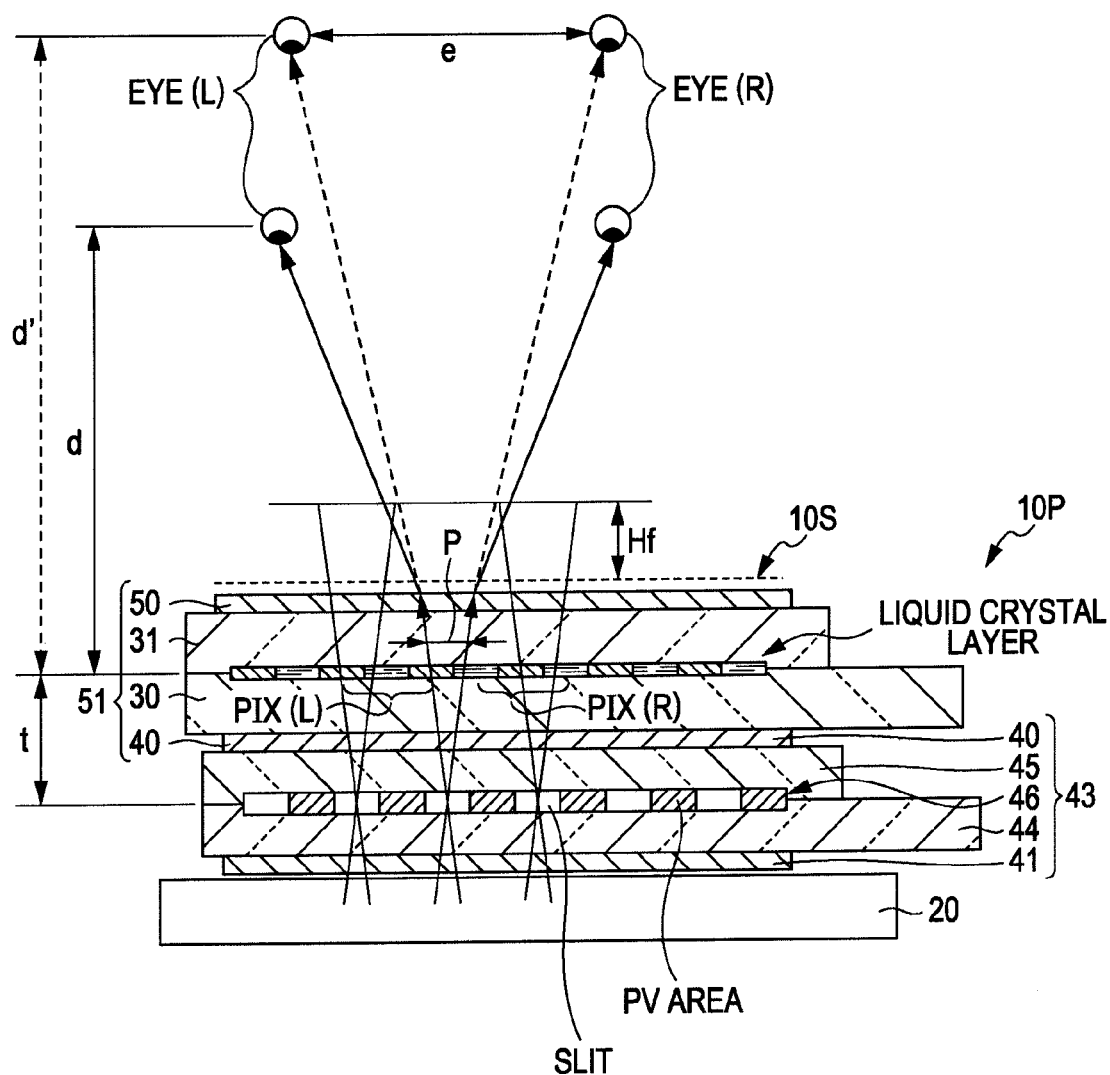
FIG. 6 is a diagram showing the conditions for image formation and visual recognition of a stereoscopic image.

FIG. 6 is a diagram showing the conditions for image formation and visual recognition of a stereoscopic image. An image for the right eye is displayed in discrete pixels (hereinafter, referred to as R pixels PIX(R)), and an image for the left eye is displayed in other discrete pixels (hereinafter, referred to as L pixels PIX(L)) under the control of the display control unit that is based on an input video signal PS. The pitch of the R pixels PIX(R) and the L pixels PIX(L) corresponding to a same pixel in units of pixels in the direction in which parallax occurs is represented as a "parallax pixel pitch P" in FIG. 6. In the example shown in FIG. 6, the parallax pixel pitch P corresponds to the pitch of pixels of the optical modulation panel 51, and left and right images are repeated for each one pixel as R, L, R, L, . . . . Accordingly, the resolution becomes the half of the resolution of the original image. Then, light passing through the R pixels PIX(r) and light passing through the L pixels PIX(L), which correspond to a same pixel, are incident to the observer's right and left eyes. At this time, an image is viewed by the observer as if being imaged at a predetermined distance from the outer surface 10S. Hereinafter, the virtual image position (a distance from the outer surface 10S) of the 3D display image is referred to as a "3D display height Hf". The parallax image pitch corresponds to a so-called amount of deviation of an image, and the 3D display height corresponds to a so-called amount of protrusion of the 3D image.

When the pixel pitch of the optical modulation panel 51 and the line pitch of the barrier formed by the parallax barrier exactly coincide with each other, only the parallax is matched on the front center. Accordingly, in order to match the parallax, the pitch of the parallax barrier is slightly larger than the pixel pitch of the optical modulation panel.

In FIG. 6, a distance from the liquid crystal layer of the optical modulation panel 51 to the liquid crystal layer (the switching liquid crystal layer 46) of the parallax barrier 43 is denoted by "t", and a distance between two eyes of a general person is denoted by "e". In such a case, "d'" that is defined in p:t=e:(t+d') represents the position of the eye in a case where there is no difference between the average refractive index (the refractive index of glass is dominant) of an image optical path of the display panel 10P and the refractive index of the air. When an optimal position is roughly approximated through actual visual recognition by mainly using the difference between refractive indices of glass and the air, the visual recognition position d of a stereoscopic image can be approximately acquired as d~d'/1.5. In addition, the images are combined alternately on the front side and the rear side of the liquid crystal display panel. However, in this type, the parallax barrier is disposed such that the images are combined on the front side when viewed from the front side. In addition, the position of the parallax barrier panel is described to be between the optical modulation panel and the back light. However, this order may be reversed, and the order of the back light=>the optical modulation panel=>the parallax barrier panel may be adopted.

The 3D display height Hf depends on other parameters such as diffusivity of light. However, in a case where these parameters are set to be constant, the 3D display height Hf can be controlled by mainly using the parallax pixel pitch P. In other words, as the parallax pixel pitch P is increased, the 3D display height Hf increases as much. In a case where a panel having delicate pixels is used, in order to set the 3D display height Hf to be in a practical range of several mm to several tens of mm from the outer surface 10S, the thickness of the glass is formed to be thin. In this embodiment, by etching glasses of both the parallax barrier 43 and the optical modulation panel 51 so as to be formed thin, such specifications are satisfied.

Object Detecting Operation

The object detecting operation is performed by controlling the proximity sensor panel 60P shown in FIGS. 3A and 3B by using the detection determining unit 6 shown in FIG. 5.

In FIG. 3A, each of the m driving electrodes DE1 to DEm and each of the n sensor lines SL1 to SLn are capacitively coupled together with a predetermined force. Thus, in the state, the m driving electrodes DE1 to DEm are sequentially AC-driven by scanning of the sensor reading V driver 6V. In a case where a fingertip is sufficiently far from the outer surface 10S, electric potential changes (AC voltage changes) in the n sensor lines SL1 to SLn are uniform. On the other hand, in a case where a fingertip becomes close to the outer surface 10S to the degree of being on the outer surface 10S, a state in which external human capacitance is effectively attached to existing electrostatic capacitance in several intersections of electrodes near the fingertip is formed. Accordingly, the crest value of the AC voltage changes decreases in accordance with the value of the external capacitance.

The decrease in the crest value of the AC voltage changes, for example, is detected so as to be determined as follows. In the detection determining unit 6 shown in FIG. 3A, particularly in the sensor driving detecting section 6B shown in FIG. 5, a detection circuit is disposed, for example, for each sensor line. The output of the detection circuit is sampled on a regular basis in cooperation with the control circuit 7, and the sampling result is determined based on a threshold value Vt, whereby placement of an object is monitored. Here, the detection circuit for each sensor line is preferably disposed inside the display panel 10P together with the sensor driving circuit 6A. For example, the detection circuit for each sensor line can be arranged as the sensor reading H driver 6H.

In the middle of a process in which the sensor reading V driver 6V repeats to perform sequential scanning within the screen, it is observed that the level of the sampling result is decreased in a sensor line (commonly, a plurality of consecutive sensor lines) so as to be lower than a threshold value Vt. Then, the detection determining unit 6 determines that an object such as a fingertip is in proximity to (or brought into contact with) the outer surface 10S. The address of one or a plurality of sensor lines for which the proximity is determined corresponds to the position of the object for the direction x, and a time (a time within one screen scanning time that is acquired from the synchronization information of the clock) at which the proximity is determined corresponds to position information of the object for the direction y. Accordingly, the detection determining unit 6 not only detects the proximity of an object but also detects the position of the object.

In this embodiment, it is detected that a detection target object is in proximity to the outer surface 10S based on the distance (height) from the outer surface 10S that is set based on the parallax information (for example, it corresponds to the parallax pixel pitch P) included in a video signal PS. More desirable prerequisite is that the proximity sensor panel 60P has a characteristic of object detection sensitivity having a lower limit of detection in a position that is the same as that of the 3D display height Hf (FIG. 6), in which a stereoscopic image is imaged based on the parallax information, or in a position located on a side closer to the outer surface 10S than the 3D display height Hf.

Figure 7:
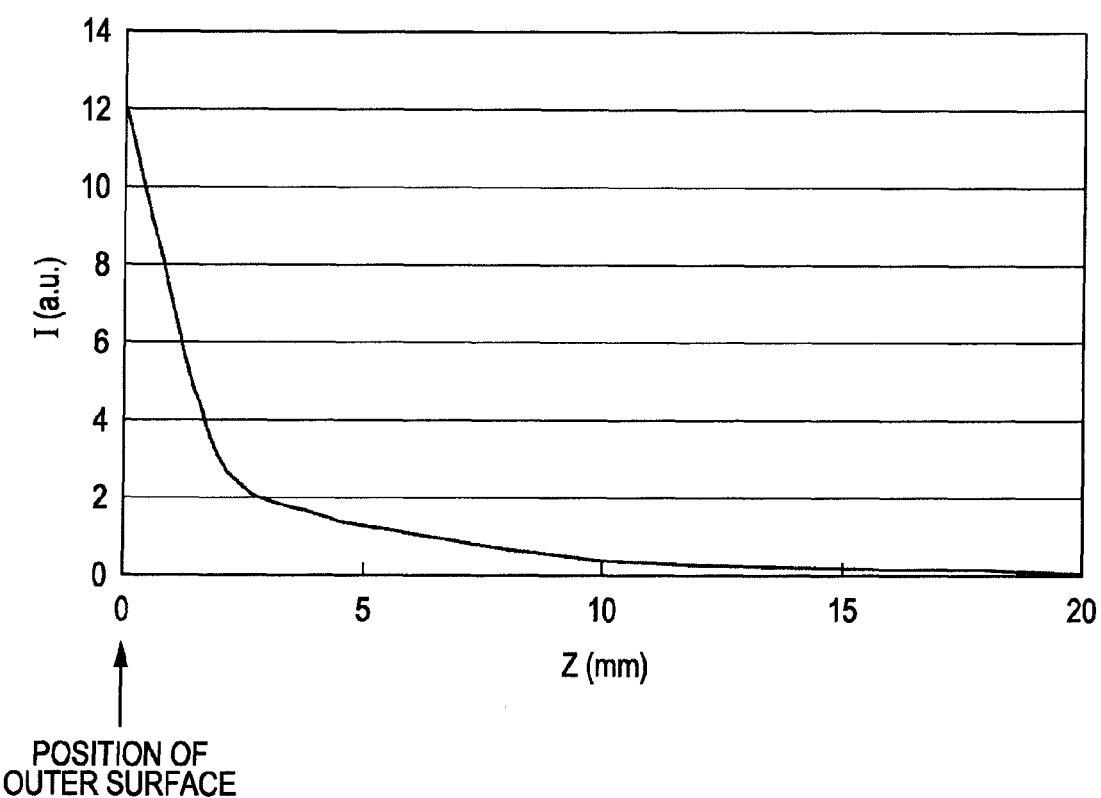
FIG. 7 is a graph representing the sensitivity characteristic of object detection of the proximity sensor panel of the electrostatic capacitor type according to the first embodiment.

FIG. 7 shows an example of the characteristic of the object detection sensitivity of the proximity sensor panel 60P. In FIG. 7, the horizontal axis represents a distance in the height direction (direction z) from the position of the outer surface 10S shown in FIG. 6 set as the origin, and the vertical axis represents the sensitivity I in an arbitrary unit (a.u.). For example, when the lowest sensitivity of the detection limit is 1 (a.u.) in the vertical scale of FIG. 7, an object can be detected from the state of being brought into contact with the outer surface 10S to the state of being located at a height of about 10 mm. When an ordinary parallax pixel pitch P is defined so as to generate a stereoscopic image at the 3D display height Hf of several mm to 10 mm, the above-described desired prerequisite is satisfied by the sensitivity characteristics shown in FIG. 7.

On the other hand, when the desired prerequisite is not satisfied by the sensitivity characteristics shown in FIG. 7, the structural parameter of the display panel 10P is set so as to satisfy the desired prerequisite, which is the feature of this embodiment. As such a structural parameter, the most effective parameter is a parameter of the wiring of the proximity sensor and the thickness of glass. A method in which the sensitivity of the sensor is improved by increasing the wiring width (the driving electrode DE and the source line SL) or thinning out the wires as is necessary so as to acquire a desired wiring width can be used. In addition, a method in which the wires are tied up so as to be roughly detected in the 3D display mode, and the wires returns to their original state so as to be delicately detected in the 2D display mode can be used.

In addition, the structural parameter may be used in a case where the optical component is a component other than the parallax barrier (PV) and the optical modulation panel 51 is a panel other than the liquid crystal panel. Commonly, there is a support body for an optically transparent material such as glass, and a decrease in the thickness of the support body can contribute much to a decrease in the entire thickness. Accordingly, a structural parameter of decreasing the thickness of the support body of at least one of the image generating unit (in this example, the optical modulation panel 51) and the optical component (in this example, the PV) for improving the sensitivity is used. Even in such as case, another structural parameter (for example, the thickness of the wiring width of the sensor) may be configured to be decreased together with the thickness of the support body.

Figure 8A:
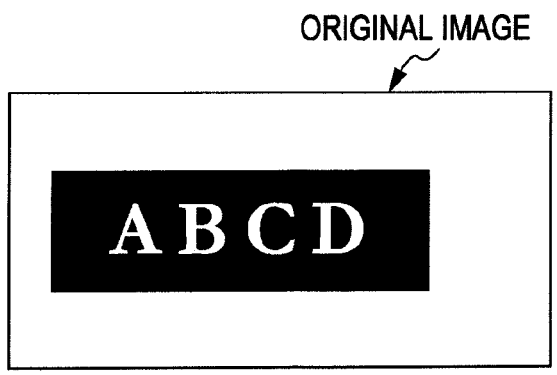
FIGS. 8A, 8B, and 8C are diagrams showing an example of images for stereoscopic image display.
Figure 8B:
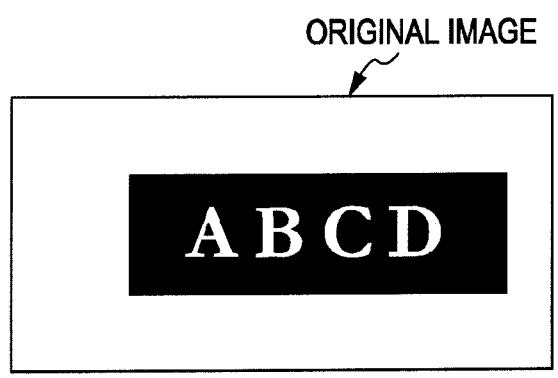
Figure 8C:
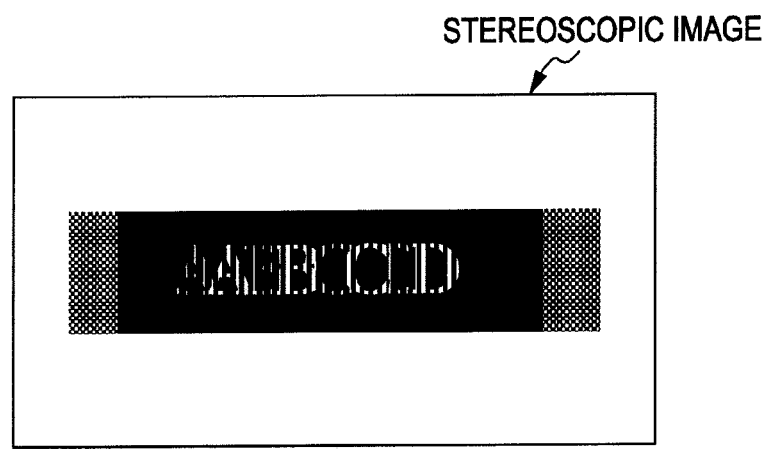

In FIGS. 8A, 8B, and 8C, an example of images for stereoscopic image display are shown. As shown in FIGS. 8A and 8B, two-dimensional images are separately generated for the left and right sides, and a spatial-division video signal PS in which two-dimensional images for the left and right sides are alternately overlapped with each other every one line is applied to the optical modulation panel 51. In the video signal PS, parallax information representing a spatial difference in the images at the time of being overlapped is included. The optical modulation panel 51 and the display control unit detect the parallax information from the optical modulation panel 51 and perform a control process appropriate for the parallax information by using the parallax barrier 43, whereby generating a stereoscopic image (FIG. 8C) acquired by composing two two-dimensional images. In addition, in the configuration example shown in FIG. 5, the control circuit 7 extracts the parallax information. However, a dedicated circuit other than the control circuit 7 may be configured to extract the parallax information.

The stereoscopic image may be an arbitrary image. As an example, there is a case where an operation button is stereoscopically displayed. FIGS. 9A and 9B show an example of a button operation. In the example shown in the figure, four start buttons are stereoscopically displayed at the same 3D display height Hf. When a stereoscopic display button of "START C" out of these buttons is operated (FIG. 9A), a sensor reaction (object determination) occurs immediately at the time point. Then, immediately, as shown in FIG. 9B, only the operated stereoscopic display button is changed to a two-dimensional display button having the 3D display height Hf=0. Accordingly, an operator can acquire the result of the operation instantly at the operation time point, similarly to the case of a general two-dimensional image. Therefore, dissatisfaction for the operation is resolved.

Such an excellent reaction is achieved by adjusting the reaction position of the sensor to the image forming position (the 3D display height Hf) of the stereoscopic image that is apart from the outer surface 10S. Accordingly, the stereoscopic image displaying device is configured so as to satisfy the above-described desired prerequisite of the characteristics of sensitivity. In such a case, regarding conversion of the image, since the other three switches remain to be 3D, the parallax barrier is maintained without any change, and only an image relating to the one switch is changed to 2D.

In this method, displaying an ordinary two-dimensional image can be implemented by allowing the parallax barrier panel to perform ordinary white display. In such a case, the touch panel can be used as a general contact-type touch panel by setting the driving thereof.

The above-described image conversion is appropriately changed in accordance with an application program and is not limited to the case of a button operation. For the use such as drawing software, in which information on the operation position is important, image conversion can be performed with excellent reaction. In addition, when an input video signal is for 2D display, 2D display can be performed by driving the parallax barrier without any change. The resolution of the 2D display for such a case is low. However, an advantage in that 3D display can be smoothly performed in a case where 3D image information is input can be acquired.

However, in a case where the stereoscopic image displaying device is a device used for a specific use such as banking and other procedures, an application program and an execution processing unit (the image processing circuit) may be included inside the stereoscopic image displaying device. Since such an image processing circuit is large-scaled, generally, the image processing circuit is mounted on a substrate other than the display panel 10P as an IC. However, a stereoscopic image displaying device may be configured so as to include a mounting substrate.

Such an execution processing unit, although not shown in this embodiment, performs image conversion by applying a feedback to a display video, as will be described in detail as an example of application for an electronic apparatus. An electronic apparatus is different from a device for a specific use in that there are a plurality of application programs stored therein, switching between the application programs is performed, and a new program from the outside may be ported.

2. Second Embodiment

The second embodiment is an example in which an electrostatic capacitance-type sensor is built in a display panel. The second embodiment relates to a configuration of a partially-built-in type in which a driving electrode of the display panel is commonly used as a sensor driving electrode. There is only a structural difference between the first and second embodiments, and other operations, detection techniques, and the like are the same as those of the first embodiment. Thus, hereinafter, only the difference will be described.

Figure 10:
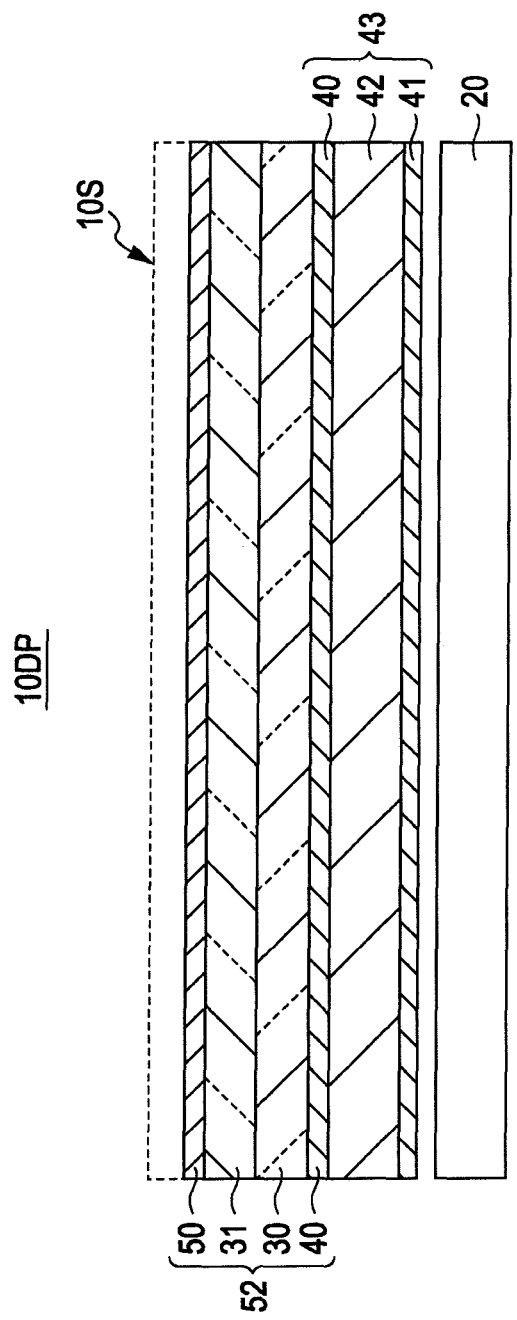
FIG. 10 is a schematic cross-sectional view of a display panel according to a second embodiment of the present invention.

FIG. 10 is a schematic cross-sectional view of a display panel according to this embodiment. In the configuration shown in FIG. 10, the proximity sensor panel 60P (FIG. 2) is omitted, and an optical modulation panel denoted by reference sign 52 has the function of the sensor. Hereinafter, this optical modulation panel is referred to as a sensor built-in panel 52.

Figure 11A:
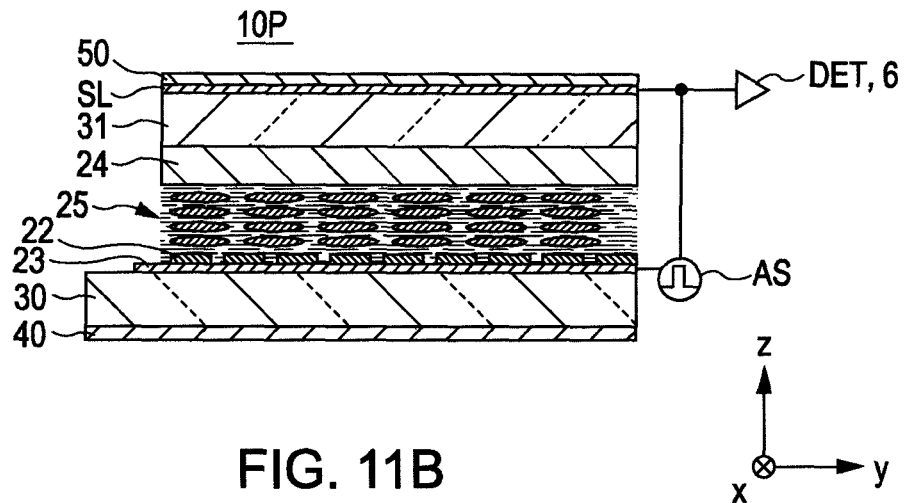
FIGS. 11A to 11C are diagrams representing the plane and the cross-section of an optical modulation panel shown in FIG. 10 in detail.
Figure 11B:
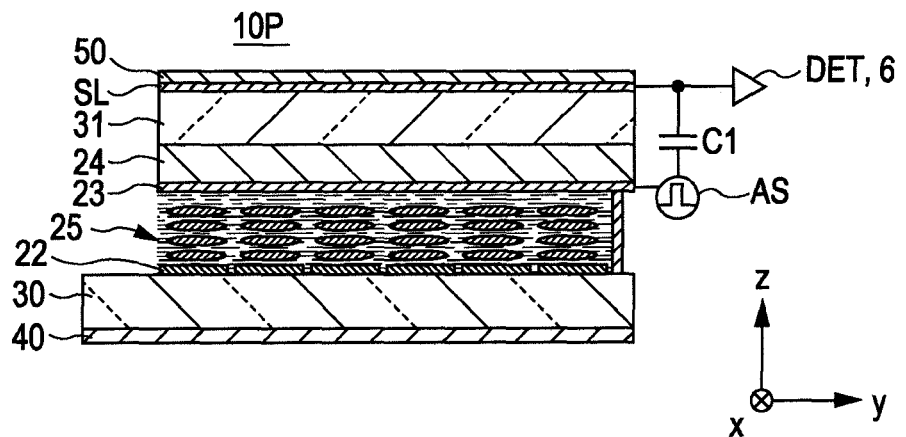
Figure 11C:
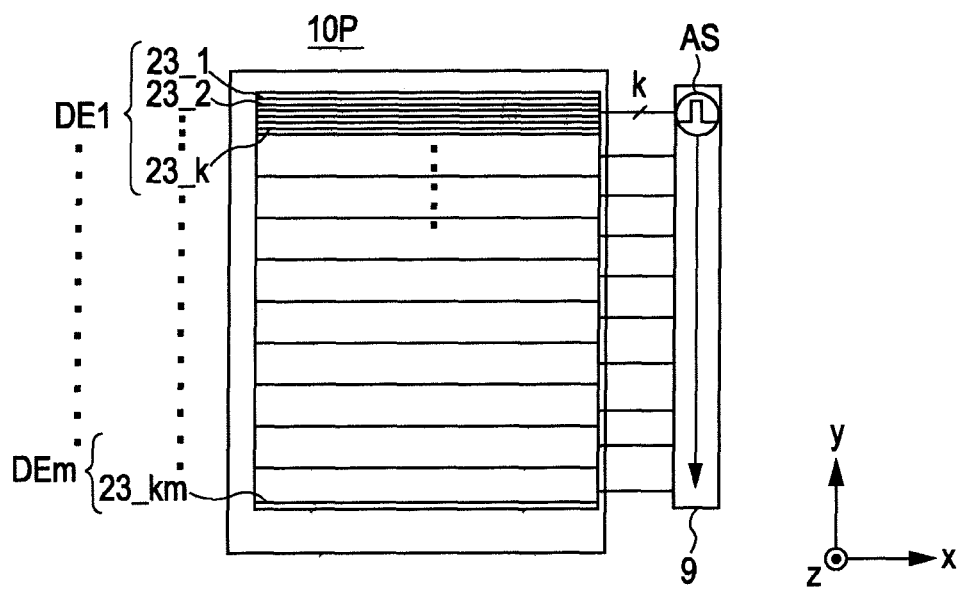

In FIGS. 11A to 11C, detailed cross-sectional views and a plan view are shown. The configuration of the cross-section shown in FIG. 11A is the configuration of a display panel that is operated in a vertical driving mode such as an IPS mode.

Figure 12:
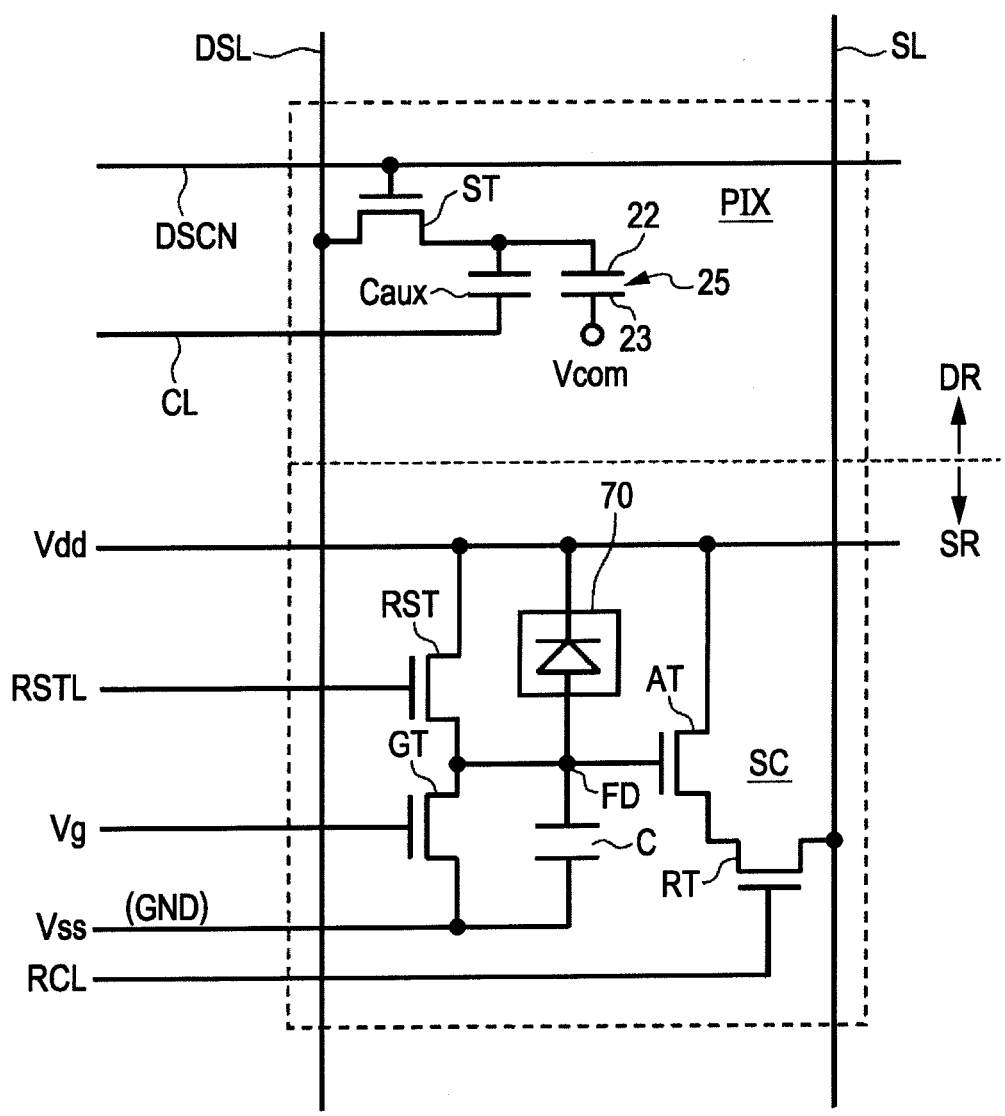
FIG. 12 is a circuit diagram of a pixel circuit and a proximity sensor circuit according to a third embodiment of the present invention.

In the display panel 10P shown in FIG. 11A, pixels that are the same as those of a third embodiment, to be described later, shown in FIG. 12 are disposed in a matrix (in the figure, only six pixels are shown). In each pixel, an electrode that drives a voltage to the liquid crystal layer 25 is a pixel electrode 22 that is separated for each pixel and is disposed in a matrix. In addition, the other pixel is a driving electrode 23 that is common to a plurality of pixels.

The pixel electrode 22 is connected to a signal line that is wired for each pixel row elongated in the direction y through a TFT not shown in the figure. A video signal PS is applied to this signal line. The control of supply of the video signal PS is performed by the display H driver 5H shown in FIG. 1. The gate of the TFT is driven through a scanning line that is wired for each pixel row elongated in the direction x, and a display V driver 5V performs line-sequential scanning of a plurality of the scanning lines.

To the driving electrode 23, a common driving signal Vcom is applied. The common driving signal Vcom is a signal that is acquired by inverting a positive electric potential and a negative electric potential with a center electric potential thereof used as a reference for each one horizontal period (1H). For example, the driving electrode 23 is formed so as to be buried in a planarization film formed in the TFT substrate 30, and the pixel electrode 22 is formed on the planarization film. In addition, a semiconductor thin film forming the TFT not shown in the figure, pixel control wires such as a signal line and a scanning line are formed to have hierarchy within the planarization film. In the TFT substrate 21, a detection circuit DET of a detection determining unit 6 shown in FIGS. 11A and 11B may be formed.

The driving electrode 23 is additionally used as a driving electrode DE (see the first embodiment) of a touch detection sensor that configures a part of a proximity sensor performing a proximity detecting operation.

Described in more detail, in a more preferred driving process, as shown in FIG. 11C, k driving electrodes 23 are driven by the sensor reading V driver 6V as one driving electrode DE. At this time, the driving electrodes 23-1 to 23-k are determined to be selected as the first driving electrode DE1. In the selective driving (driving of a driving electrode DE2) of the next driving electrode 23, the next k driving electrodes 23 can be determined by shifting the arrangement of the driving electrodes 23, which is an arrangement at the time of selecting the driving electrode DE1, by an arbitrary number of the driving electrodes 23 that is equal to or greater than one and smaller than k. The sensor driving is performed by repeating the above-described operations.

In such a driving operation, when the width of the driving electrode DE is not large, it is difficult to acquire high sensitivity (the amount of an AC voltage decrease in the sensor line SL). On the other hand, when the driving electrodes are formed from a single conductive layer, switching during the driving process is visually recognized. In order to resolve or alleviate the tradeoff, the above-described driving is preferred. There is a case where the characteristics of the sensitivity shown in FIG. 7 are desired to be improved in the first embodiment. However, in a sensor built-in type, the tradeoff may be a factor for limiting the improvement of the characteristics of the sensitivity. In such a case, by employing the technique of selecting and shifting the plurality of electrodes shown in FIG. 11C, the factor for the limitation is eliminated or relieved. Accordingly, an advantage in that the sensitivity can be easily improved can be achieved.

On the liquid crystal layer side of an opposing substrate 31, a color filter 24 is formed. The color filter 24 is configured by periodically arranging color filter layers, for example, of three colors of red (R), green (G), and blue (B). One of three colors of R, G, and B is assigned to each pixel PIX (the pixel electrode 22). There are cases where a pixel to which one color is assigned is referred to as a sub pixel, and sub pixels of three colors of R, G, and B are referred to as a pixel. However, here, a sub pixel is also referred to as a pixel PIX.

On one face (the outer surface 10S side) of the opposing substrate 31, sensor lines SL are formed. In addition, on the sensor lines SL, a second polarizing plate 50 is formed. The arrangement of the sensor lines SL is the same as that shown in FIGS. 3A and 3B. In addition, a first polarizing plate 40, similarly to that of the first embodiment, is attached to the rear face of the TFT substrate 30. Here, the arrangement of the second polarizing plate 50 and a layer for forming the sensor line SL may be opposite to that of the example shown in the figure. In addition, a detection circuit DET of the detection determining unit 6 that performs a proximity detecting operation may be formed in the opposing substrate 31.

In the cross-section, which is shown in FIG. 3B, representing the proximity sensor panel 60P according to the first embodiment, the sensor lines SL are disposed on the outer surface 10S side, and the driving electrode DEm is disposed between the first sensor substrate 11 and the second sensor substrate 12. This basic arrangement is the same in FIG. 11A. In other words, in terms of the positional relationship between the substrates, the TFT substrate 30 corresponds to the first sensor substrate 11, and the opposing substrate 31 corresponds to the second sensor substrate 12. In addition, the driving electrodes 23 (the constituent elements of the driving electrode DEm) are disposed between the TFT substrate 30 and the opposing substrate 31. Furthermore, the sensor lines SL are disposed on the outer surface 10S side of the second sensor substrate 12. In FIGS. 3A and 3B, the arrangement position of the sensor lines SL and the driving electrode DEm may be reversed. However, in FIGS. 11A and 11B, there is necessarily no electrode or wire of which the electric potential is changed on the periphery of the sensor lines SL, and accordingly, the sensor lines SL are disposed on the outer surface 10S side.

In addition, between the liquid crystal layer 25 and the TFT 30 and between the liquid crystal layer 25 and the opposing substrate 31, alignment films are disposed.

In the second embodiment and the first embodiment described above, as the material of the liquid crystal layer 25, a liquid crystal material that is appropriate for various display modes such as TN (twisted nematic), VA (vertical alignment), IPS (in-plane switching), and ECB (electrically controlled birefringence) is used. In addition, active-matrix driving is preferable, and a semiconductor thin film in which TFTs used for pixel selection for the active matrix driving are formed may be any film of polycrystalline silicon (p-Si) and amorphous silicon (a-Si).

The liquid crystal layer of TN or VA, commonly, has a driving mode of a vertical electric field. In such a case, as shown in FIG. 11B, the driving electrode 23 is disposed on the opposing substrate 31 side, that is, between the color filter 24 and an alignment film (not shown). Accordingly, the driving electrode 23 is connected to the TFT substrate 21 through a contact conductive pillar. A common driving signal Vcom having an AC pulse waveform is applied to the driving electrode 23 from the TFT substrate 21 through the contact conductive pillar. In FIG. 11B, the detection circuit DET may be formed on the opposing substrate 31 side or on the TFT substrate 30 side.

According to the second embodiment, the function of the proximity sensor panel and the function of the display panel are integrated as the sensor built-in panel 52. Accordingly, the number of substrates (glass substrates) as support bodies particularly occupying a large thickness is decreased. Therefore, there is an advantage in that high sensitivity can be implemented more easily than the first embodiment.

3. Third Embodiment

As a type in which the sensitivity of the sensor can be easily improved in accordance with advance of semiconductor devices and which has relatively high sensitivity and can be easily built in a display panel, there is an optical type. This embodiment relates to a stereoscopic image displaying device having an optical sensor disposed inside the display panel. In the description below, particularly the circuit configuration of the proximity sensor and other aspects that are different from those of the electrostatic capacitance type described in the first and second embodiments will be described. Accordingly, there is no difference between the embodiments in the structure of the parallax barrier (PV), the basic of the stereoscopic image displaying operation, and the basic (particularly, the relationship between the sensitivity of detection and the imaging height) of the object detecting operation described above except for the detection principles of light and a change in the electrostatic capacitance.

In this embodiment, a sensor built-in panel 52 is included, similarly to the second embodiment. Accordingly, the schematic configuration of the cross-section shown in FIG. 10 can be applied to this embodiment.

In the optical type, an optical sensor array in which sensor circuits including light sensing devices are disposed in a matrix pattern is included in the sensor built-in panel 52. The position of the optical sensor array may be located either on the TFT substrate 30 side or on the opposing substrate 31 side. For example, when a case where the optical sensor array is formed on the opposing substrate 31 side is described with reference to the cross-section of the electrostatic capacitance type shown in FIG. 11A, the formation position of the optical sensor array is, commonly, between the opposing substrate 31 and the color filter 24. However, when the optical sensor array is formed on one surface of the glass substrate by using TFT manufacturing technology, and the color filter 24 can be formed on the rear surface of the glass substrate, the optical sensor array may be disposed between the opposing substrate 31 and the second polarizing plate 50 (in this case, there is no sensor line SL).

On the other hand, in a case where the optical sensor array is formed on the TFT substrate 30 side, in the viewpoint of easiness of manufacturing, it is preferable that the optical sensor circuit is formed in the layer, in which the TFTs for the pixels are formed, on the TFT substrate 30 side relative to the pixel electrode 22. However, the optical sensor circuit may be formed in a different layer.

Although the light sensing device is included in the optical sensor circuit, the light source may be configured to be the back light 20 shown in FIG. 10. However, in a case where reflective light that is generated by light, which is emitted from a light source, such as display light reflecting from a detection target object is received, light that is received by the influence of irregular reflection from the surrounding thereof becomes a noise component. Accordingly, it is difficult to obtain high optical sensitivity. In order to enhance the S/N ratio, it is preferable that the sensitivity characteristic of the light sensing device is set so as to have a sensitivity peak or a sensitivity center wavelength for non-visible light other than visible light such as infrared rays. In addition, even when the sensitivity characteristic does not have a peak or the like in an infrared region, the S/N ratio may be enhanced only by setting the sensitivity peak or the like in the near-infrared region or in the vicinity thereof by shifting the sensitivity peak or the like from the center of the distribution of the visible light.

A light source having a wavelength corresponding to the sensitivity peak or the optical center wavelength of the light sensing device may be disposed inside the back light 20. Alternatively, a surface emitting unit that is dedicated for light emission of detection light such as infrared rays may be disposed in addition to the back light 20. The surface emitting unit may be interposed between the optical modulation panel and the outer surface 10s as long as sufficient light permeability is acquired for visible light. However, in such a case, it may be difficult to take the 3D display height Hf shown in FIG. 6. In addition, when the dedicated surface light emitting unit is disposed, and there is a disadvantage in terms of costs. Thus, infrared LEDs may be disposed inside the back light 20 with the number of frequency and the disposition that are appropriate for white LEDs.

In addition, a configuration in which only light emitted from the white LEDs is output from the back light 20 so as to be used for both display light and detection light, and a wavelength selectivity for effectively permeating the light in the infrared region or the near-infrared region by blocking or attenuating visible light in a portion corresponding to the sensor region of the color filter layer is implemented may be used. In addition, the S/N ratio may be raised by forming a light collecting lens array that effectively guides the detection light (reflective light) on the light sensing surface of the light sensing device and by raising the blocking rate for the total amount of the received light on the detection target object side. A plurality of the above-described methods of enhancing the S/N ratio may be arbitrarily combined.

Configuration Example of Pixel Circuit and Sensor Circuit

FIG. 12 is a circuit diagram of a pixel circuit (an equivalent circuit of the pixel PIX) and a proximity sensor circuit SC that are formed in a same layer or in different layers. In a case where noise reduction (shielding visible light) is performed by using a color filter, the proximity sensor circuit SC is disposed, for example, by using a light shielding area that is disposed between display pixel portions of the pixel array. Thus, while an area in which the pixel used for display is disposed is referred to as a "display region DR", an area in which the proximity sensor SC is disposed is referred to as a "sensor region SR". The display region DR and the sensor region (light shielding area) SR are repeated at a predetermined ratio so as to be regularly disposed within the plane viewed from the outer surface 10S.

In the display region DR, a selection transistor ST formed by a thin film transistor (TFT) or the like is disposed near an intersection of a display scanning line DSCN extending in the horizontal direction and a video signal line DSL extending in the vertical direction. In a case where the selection transistor ST is formed from an FET, the gate is connected to the display scanning line DSCN, and the drain is connected to the video signal line DSL. The source of the selection transistor ST is connected to the pixel electrode 22 of each pixel. The pixel electrode 22 is an electrode that drives an adjacent liquid crystal layer (optical modulation layer) 6 and, commonly, is formed from a transparent electrode material.

For example, in a supply line of the common driving signal Vcom that extents in a direction (the horizontal direction) perpendicular to the video signal line DSL, an opposing electrode (the driving electrode 23) that faces the pixel electrode 22 with the liquid crystal layer interposed therebetween is disposed. The opposing electrode (driving electrode 23) is, commonly, disposed so as to be common to the pixels and is formed from a transparent electrode material. In addition, when limiting to the disposition of the pixel electrode 22 and the driving electrode 23, the disposition is as shown in FIGS. 11A and 11B.

In each pixel PIX disposed in the display region DR having the above-described configuration, the selection transistor ST is turned on or off based on a display scanning signal that is supplied through the display scanning line DSCN under the control of the display V driver 5V shown in FIG. 1. When the selection transistor ST is turned on, a pixel voltage corresponding to the video signal PS that is supplied to the video signal line DSL at this time under the control of the display H driver 5H shown in FIG. 1 is applied to the pixel electrode 22, whereby the display state is set.

An auxiliary capacitor Caux that is disposed in the pixel PIX and an auxiliary capacitor line CL that is a control line thereof are used in a minute pixel in which the equivalent capacitance of the liquid crystal layer 25 is relatively small. However, the auxiliary capacitor Caux and the auxiliary capacitor line CL may be omitted. The control of the auxiliary capacitor line CL, similarly to the display scanning line DSCN, is performed by the display V driver 5V shown in FIG. 1.

In the sensor region SR (light shielding area) that is adjacent to the display region DR, an optical sensor 70 (light sensing device) that is, for example, formed from a photo diode or the like is disposed. Since the optical sensor 70 is reversely biased, a power source voltage Vdd is supplied to the cathode side thereof. To a floating diffusion FD that is the anode of the optical sensor 70, a reset transistor RST, a gate transistor GT, and a capacitor C are connected.

The storage capacitance of the floating diffusion FD of the optical sensor 70 is determined as the magnitude of the capacitor C, and the accumulated electric charges are discharged (reset) to the ground electric potential by the reset transistor RST. A time after the reset transistor RST is set to the OFF state from the ON state until the reset transistor is turned on next time corresponds to an electric charge accumulating time, that is, a light sensing time or a detection time. The gate transistor GT is a transistor that controls the amount of overflow (the amount of accumulated electric charges) of the floating diffusion FD and is biased to a predetermined gate voltage Vg.

In addition, between the supply line of the power source voltage Vdd and the sensor line SL extending in the vertical direction, an amplifier transistor AT and a read-out transistor RT are connected in series. By connecting the gate of the amplifier transistor AT to the floating diffusion FD, the electric potential of the floating diffusion is amplified and read out by a source follower so as to be applied to the drain of the read-out transistor RT. The electric potential after the amplification is output to the sensor line SL at a timing when the read-out transistor RT is tuned on and is input to the sensor reading H driver 6H (detection circuit DET) shown in FIG. 1.

The On or OFF operation of the reset transistor RST is controlled in accordance with a reset signal that is supplied from the sensor reading V driver 6V shown in FIG. 1 through a reset line RSTL. In addition, the ON or OFF operation of the read-out transistor RT is controlled in accordance with a read control signal that is supplied from the sensor reading V driver 6V through a read control line RCL.

In this type, light emitted from the back light side returns from a target object, and the light is sensed by an optical sensor disposed inside the sensor-built in panel 52, whereby the target object is recognized. At this moment, for example, the sensor output signal read out from the sensor line SL of the proximity sensor circuit SC is read out by the detection circuit DET so as to be sampled. Then, by comparing the sampling result with a predetermined threshold value Vt, proximity detection determining is performed.

Accordingly, in this type, the target object is not brought into contact with the liquid crystal panel, and the sensor can react in a position of a stereoscopic image that is desired to be reacted by adjusting the sensitivity of the optical sensor. In addition, in a case where the sensitivity characteristic satisfying the desired prerequisite described in the first embodiment is acquired, there is a case where adjustment of the sensitivity is not necessary. On the other hand, in a case where the sensitivity characteristic satisfying the prerequisite is not acquired, the case is responded by parameter adjustment described in the first embodiment. In other words, the structural parameter of the display panel 10P, particularly, the thickness of a support body (a glass substrate or the like) of at least one of the parallax barrier 43 and the sensor-built in panel 52 is adjusted in advance. In addition, in the case of the optical type, the optical parameter or the device parameter may be adjusted in advance such that the sensitivity characteristic satisfying the desired prerequisite can be easily acquired by further decreasing the lower limit of the detection limit by improving the S/N ratio.

Figure 13:
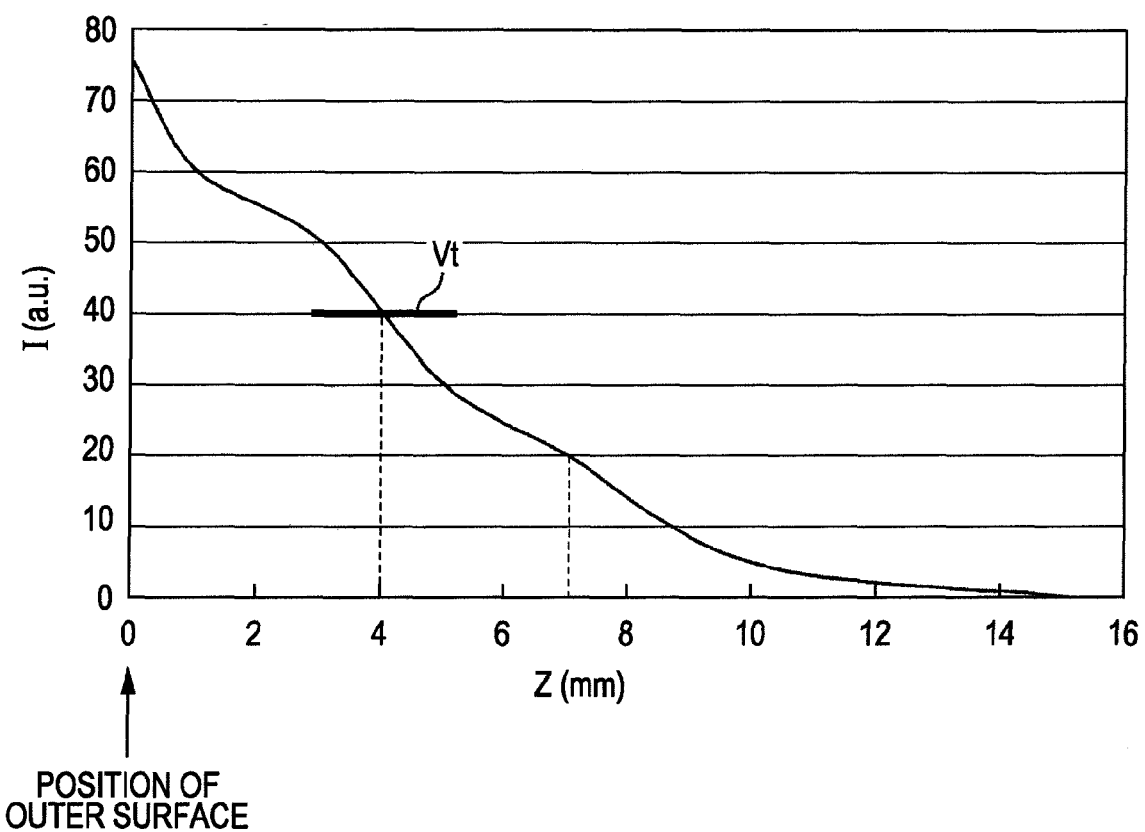
FIG. 13 is a graph illustrating the sensitivity characteristic of object detection of a proximity sensor panel of the optical type according to the third embodiment.

FIG. 13 illustrates an example of the sensitivity characteristic of the optical sensor 70. The horizontal axis and the vertical axis in FIG. 13 are basically the same as those of the case shown in FIG. 7. However, the vertical axis in FIG. 13 is the sensitivity I of the optical sensor 70 in an arbitrary unit. Accordingly, in a case where optimization of the structural parameter or optimization of the device parameter or the optical parameter is not performed, arbitrary sensitivity I=20 becomes the detection limit due to bad S/N ratio. However, even in such as case, the optical sensor of this embodiment is configured so as to detect a detection target object up to about 7 [mm] from the outer surface 10S.

When optimization of the above-described structural parameter (for example, the thickness of the substrate) is performed, the sensitivity (the point at I=20 shown in FIG. 13) that becomes the detection limit can be lowered, for example, to be equal to or smaller than 10, whereby detection at a higher position can be performed. In addition, by optimizing the device parameter and the optical parameter by disposing a wavelength selection filter, a light collecting lens, or the like, detection at a further higher position can be performed. When being compared with the case shown in FIG. 7, the sensitivity characteristic of this type has a characteristic that the linearity of the sensitivity is superior in a broad range from the detection limit to the outer surface.

Similarly to the first embodiment, a stereoscopic image is imaged in a position far from the panel, and by adjusting the reaction position of the optical sensor to the position, a reaction is made when the finger reaches the position. Accordingly, for example, similarly to FIGS. 9A and 9B of the first embodiment, the screen can be switched to an image after the reaction. In addition, according to this type, similarly to the first embodiment, ordinary two-dimensional display can be performed, and the parallax barrier panel can be used for ordinary white display. In such a case, by detecting a contact position located on surface of the liquid crystal panel based on the driving setting, the optical sensor can be also used as an ordinary contact-type touch panel.

Figure 14:
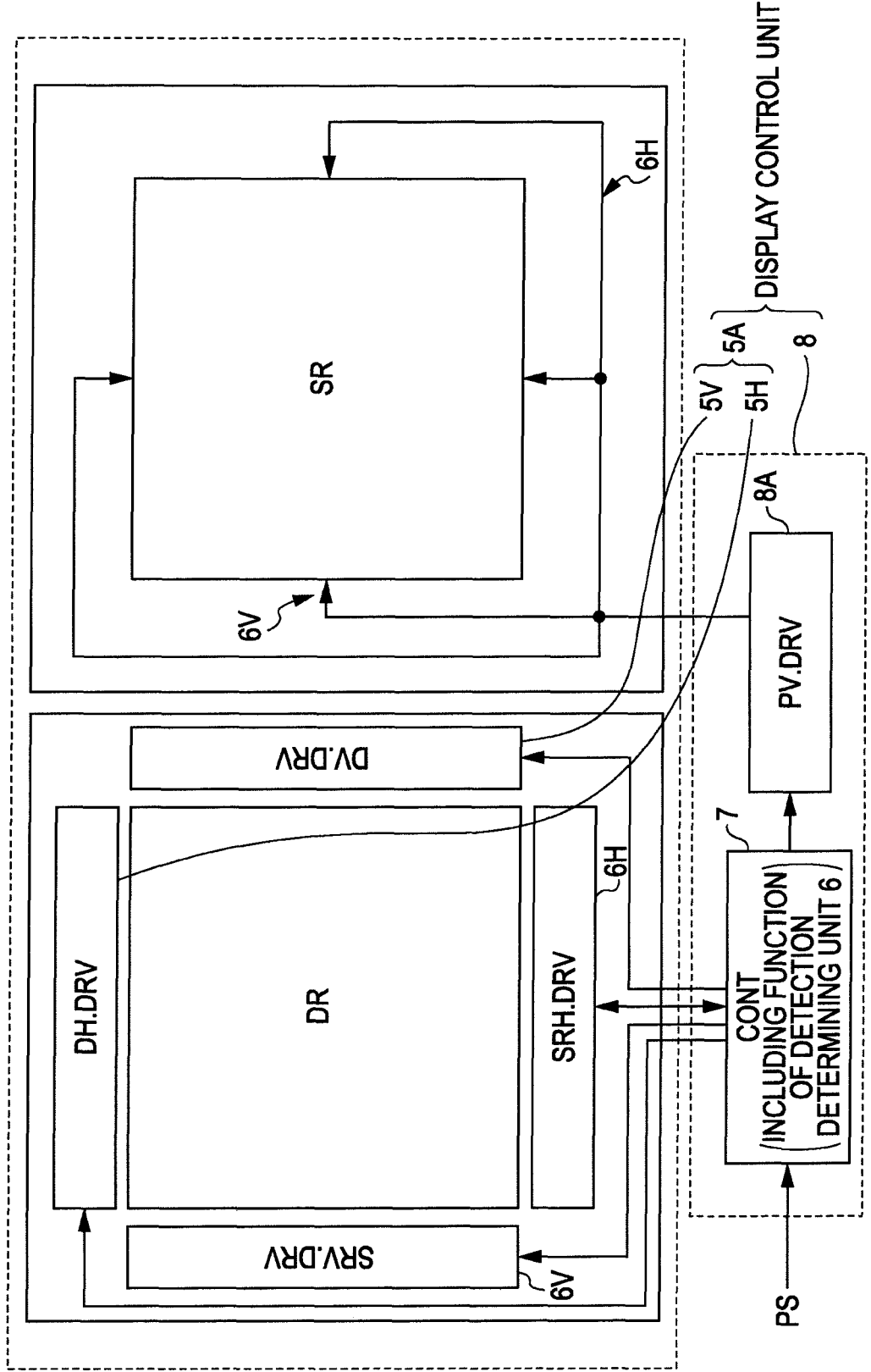
FIG. 14 is a functional circuit diagram of the optical type.

FIG. 14 represents a functional circuit diagram of the optical type. FIG. 14 corresponds to FIG. 5. When described only the difference between FIGS. 14 and 5, the sensor driving detecting section 6B shown in FIG. 5 is omitted as a block in FIG. 14. Accordingly, the function of sampling a signal transmitted from the detection circuit DET disposed inside the sensor reading H driver 6H and comparing the sampling result with the threshold value Vt for determination is added to the control circuit 7. In addition, a circuit block that is the same as the sensor driving detecting section 6B having the above-described function may be disposed in the case shown in FIG. 14. However, since the driving of the optical sensor is mainly performed by the sensor reading H driver 6H, the function performed by the above-described circuit block is only the sensor detection (sampling, comparing the sampling result with Vt, and detection).

Here, similarly to the other embodiments, it is preferable that a function of holding after sampling is included so as to acquire margin of the detection timing. In addition, similarly to the other embodiments, an analog signal may be configured to be converted into a digital signal instead of performing sampling (and holding).

4. Fourth Embodiment

This embodiment discloses an example of adaptive control of the threshold value Vt of the detection range and a display image. This embodiment can be applied together with the first to third embodiments. However, here, an example applied to the third embodiment will be described.

Figure 15:
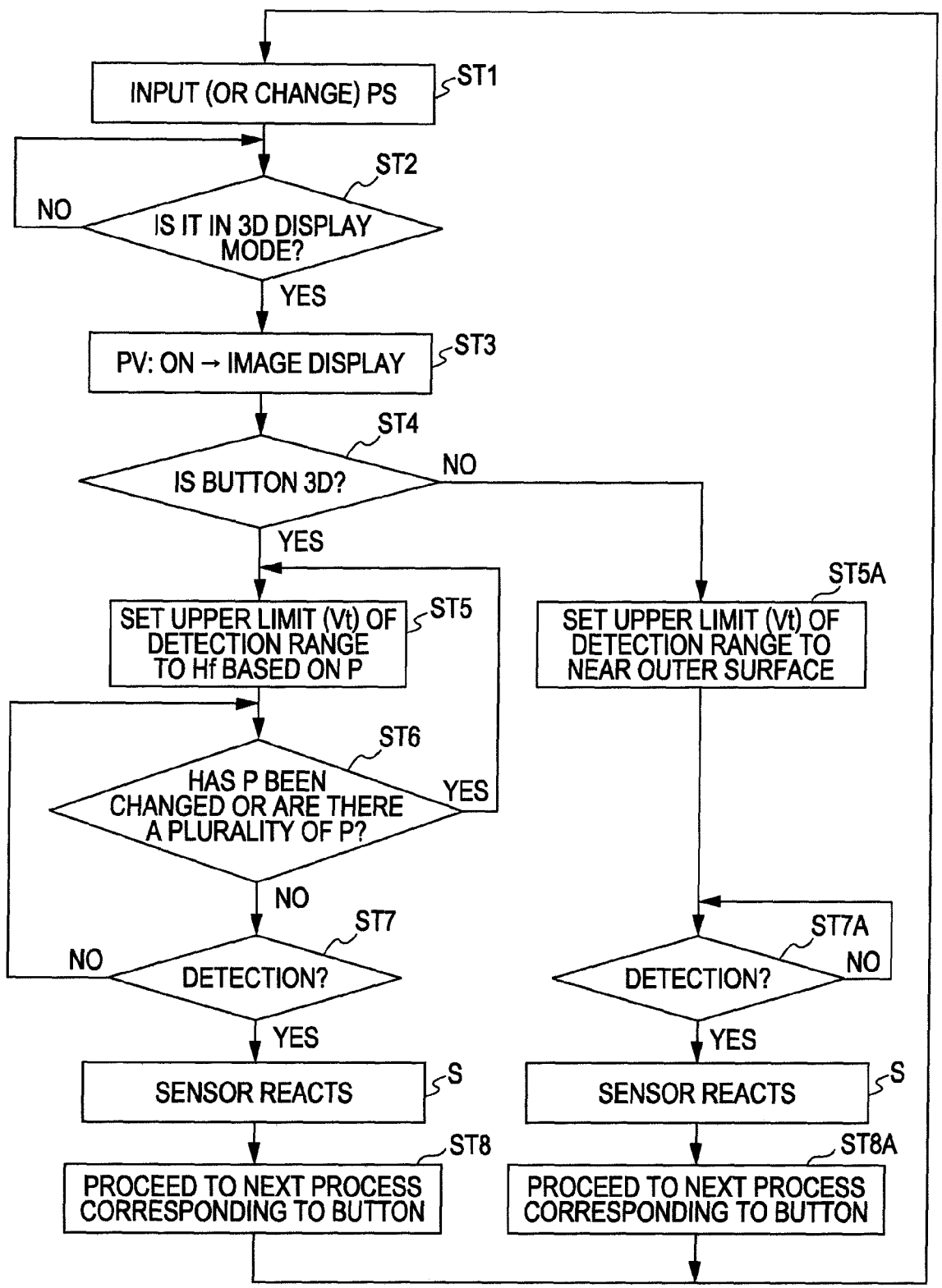
FIG. 15 is a flowchart showing a basic flow of adaptive control according to a fourth embodiment of the present invention.

FIG. 15 is a flowchart showing a basic flow of adaptive control. Hereinafter, the sequence shown in FIG. 15 will be described with the functional blocks shown in FIGS. 5 and 14 appropriately being cited as the subject of the control or the process. In Step ST1, a video signal PS corresponding to one screen is input as a time series.

In Step ST2, the control circuit 7 determines whether the display mode is a display mode of a three dimensional (3D) image or not (a display mode of a two dimensional (2D) image). In a case where the determination is "NO", a monitoring loop of Step ST2 is looped. On the other hand, in a case where the determination is "YES", in the next Step ST3, the PV (parallel barrier 43) is turned on by the parallel barrier driving circuit 8A. There is a case where a part of the screen is a 3D image. Thus, the looping of the monitoring loop of Step ST2 is so as to turn on the PV only during the display period of the part in such a case.

In Step ST3, 3D image display for a part or the whole of the screen is started in accordance with turning on the PV.

Simultaneously when the 3D display mode is determined in Step ST2, and there is a button in Step ST4, the control circuit 7 determines whether or not the button is the 3D display based on parallax information (existence of parallax pixel pitch P) included in the video signal PS. In a case where the button is 3D display, in the next Step ST5, the control circuit 7 sets the upper limit of the detection range near the 3D display height Hf determined based on the parallax pixel pitch P at the position. The upper limit of the detection range is defined, for example, as a threshold value Vt shown in FIG. 13, and a target object is detected at a height that is equal to or less than the height (here, 4 [mm] as an example) at the time. In other words, in this example, the detection range is 0 [mm] to 4 [mm].

The reason for determining the upper limit of the detection range to be the threshold value Vt is that the first detection point is important when the target object approaches from a far point, and proximity detection can be performed by setting the threshold value Vt at the first detection point and comparing the threshold value Vt with a sensor output value (sampled value). The lower limit of the detection range may not be set in an extreme case. However, it is preferable that the detection range is set to have a predetermined width in consideration of variations of the detection sensitivity characteristic within the plane and the like. Alternatively, the lower limit of the detection range may be fixed to the outer surface 10S. In the above-described example of "the detection range of 0 [mm] to 4 [mm]" is a case where the lower limit is fixed.

In the next Step ST6, the control circuit 7 determines whether there is a change in the parallax information (the parallax pixel pitch P) or there are a plurality of the parallax pixel pitches P. In a case where there is a change in the parallax pixel pitch P or there are a plurality of the parallax pixel pitches P, a threshold value Vt is set for each 3D display height Hf for buttons of which the threshold values Vt have not been set.

In a case where is no change in the parallax pixel pitch P and there is no plurality of parallax pixel pitches P, proximity determination is performed by using the set threshold value Vt in the next Step ST7. In a case where a sensor output does not reach the threshold value Vt, the case is handled as "no sense reaction", and a loop of P monitoring of Step ST6 and detection of Step ST7 is looped. Accordingly, in a case where the finger is located farther than the outer surface 10S, this loop is in the looped state even in a case where the 3D image display is performed.

When a sensor output reaching the threshold value Vt is recognized by the control circuit 7, detection is determined to have been made in Step ST7, and a detection signal of "sensor reaction (State S)" is transmitted from the control circuit 7 to the image processing circuit and the like. Accordingly, in Step ST8, the flow of the next process corresponding to the button is started.

In the flow shown in FIG. 15, the process returns back to Step ST1 simultaneously with output of the detection signal of state S so as to be in a state in which input of a next image is waited or a change in the display image is waited. When the next image is input or there is a change in the display image, the above-described series of the processes from Step ST2 is restarted.

On the other hand, when the control circuit 7 determines that the button is not the 3D display in Step ST4, the threshold value Vt is set to a position close to the outer surface (the uppermost surface of the stereoscopic display device) in Step ST5A. Accordingly, the PV is turned off only at that time, and the button is displayed as a 2D image, which is the same as in an ordinary touch panel.

In the next Step ST7A, detection is performed by using the same threshold value as in Step ST7. In a case where there is no detection, the process is in a waiting state for a sensor output that exceeds the threshold value Vt in Step ST7A. After detection is made, the flow proceeds to the next Step ST8A with being triggered by the output of the detection signal of state S, and the flow shown in FIG. 15 returns back to Step ST1.

According to the above-described detection determining control, most of the determinations and the processes are performed by the control circuit 7. Accordingly, there is a little time for the CPU or the like to perform a predetermined program sequence after the 3D display mode is started in Step ST2 until the process proceeds to the next process in Step ST8. Accordingly, the processing time is extremely short. In addition, the upper limit of the detection range for the height direction is set to a position near the 3D display height Hf. For the above-described reasons, the next process is started simultaneously with or a little bit later the user's contact on the button. Accordingly, a stereoscopic image displaying device having high responsiveness until the user recognizes a screen change is implemented. In addition, even when there is a change in the parallax pixel pitch P, the control circuit 7 disposed inside the detection determining unit 6 changes the detection range (threshold value Vt) in accordance with the change, whereby a seamless process can be performed.

In addition, in a case where the waiting state in Step ST6 is long or the like under the control shown in FIG. 15, detection at an earlier timing may be made by repeating to gradually increase the threshold value Vt from a minimum value within a predetermined range until a detection target object is detected by using the detection determining unit (control circuit 7).

FIGS. 16A to 16C3 illustrate a case where the parallax information is changed by one 3D display button. A stereoscopic image that can be formed by combining left and right original images shown in FIGS. 16A and 16B has the 3D display height Hf changing in accordance with the magnitude of the parallax information (parallax pixel pitch P). For example, there is a case where, on a specific screen of a case where an application is changed or the like, the parallax pixel pitch P is small, and the parallax pixel pitch P changes on the screen displayed thereafter. In such a case, generally, the 3D display height Hf also changes. However, since the detection range is fixed, there is a case where the responsiveness is good in an application and, the responsiveness is not good in another application.

In the flow shown in FIG. 15, the change in the parallax pixel pitch P is monitored in Step ST6, and accordingly, such variations of the responsiveness are resolved.

Figure 18A:
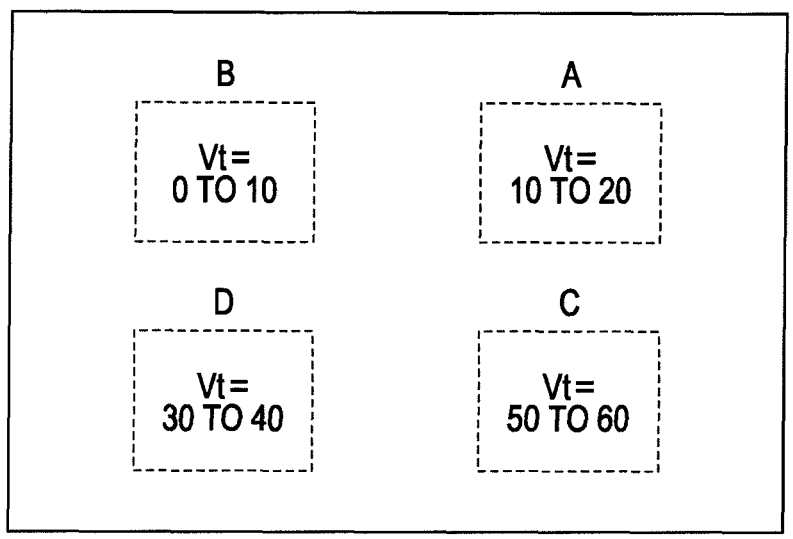
FIGS. 18A and 18B are diagrams showing an example of a set range of a threshold value for each button and an example of setting a threshold value on a sensitivity curve.
Figure 18B:
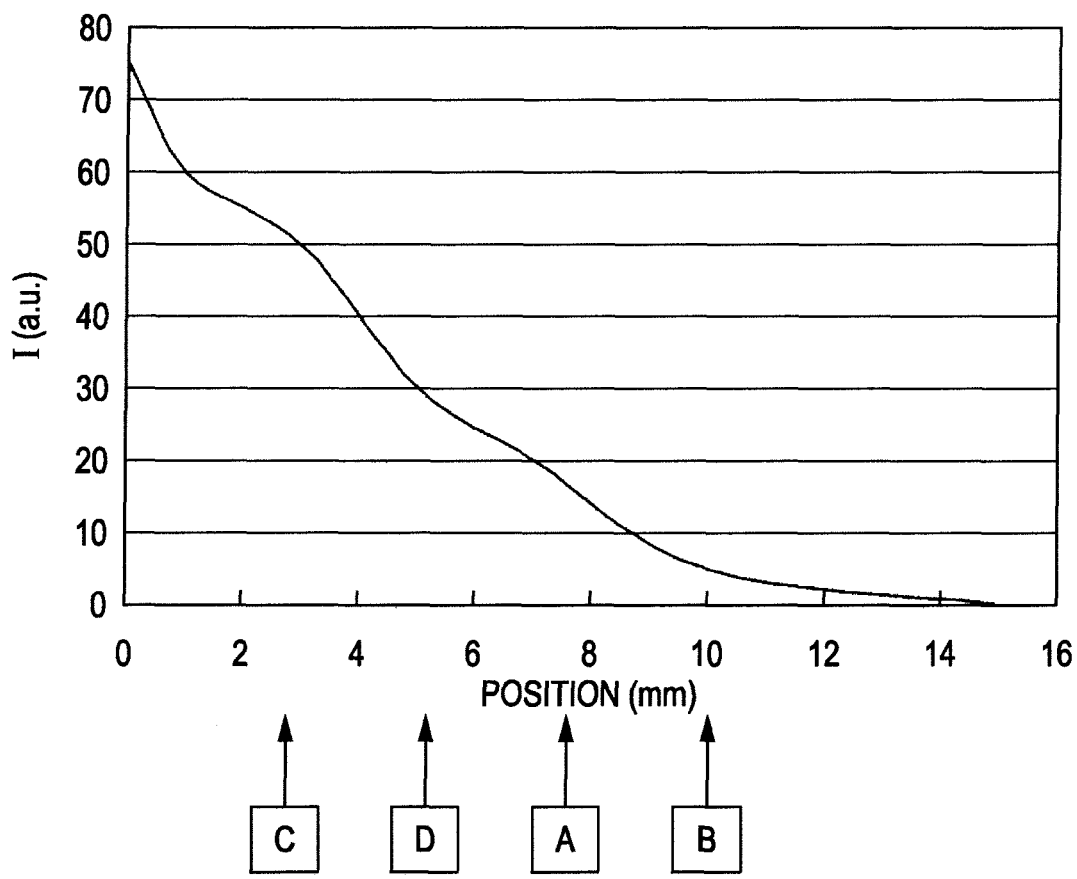

FIGS. 17A and 17B are schematic diagrams before and after an operation in a case where different 3D display heights Hf are set in a plurality of buttons. In addition, FIGS. 18A and 18B represent an example of a set range of a threshold value for each button and an example of setting a threshold value on a sensitivity curve. As an example of such a 3D display height Hf, in software programs such as simulators or games, there is a game or the like in which different images are displayed in four positions, and the images are changed by clicking the images or the like. The user can notice that a button operation is correctly performed based on whether a clicked image becomes a 2D display button, is changed with the 3D display being maintained, has the height further changed in the 3D display, or the like.

In such an application, when a time from an operation to a response is long, the application that changes the imaging states of the four buttons in a short time does not make any sense. By applying an embodiment of the present invention, each response time is shortened. Accordingly, an application using such a display time difference can be implemented.

Figure 19A:
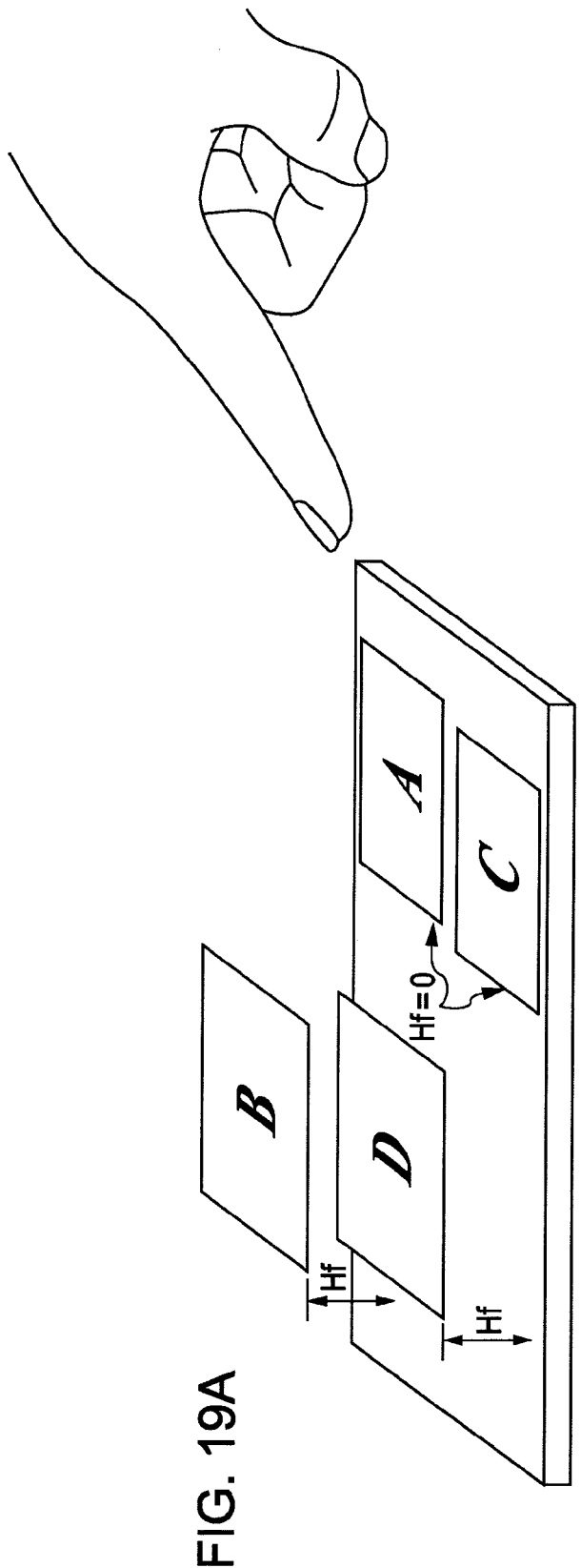
FIGS. 19A and 19B are schematic diagrams of a case where an image is changed to another image at the same imaging height.
Figure 19B:
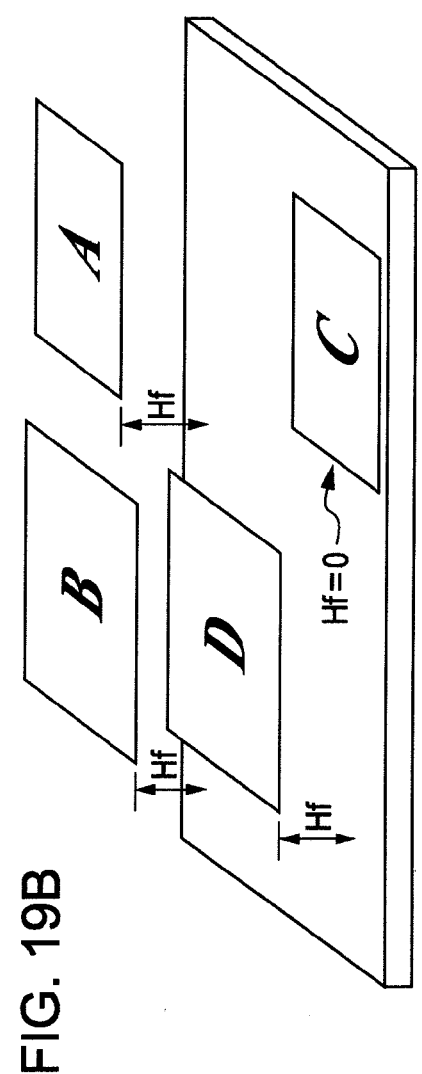
Figure 20:
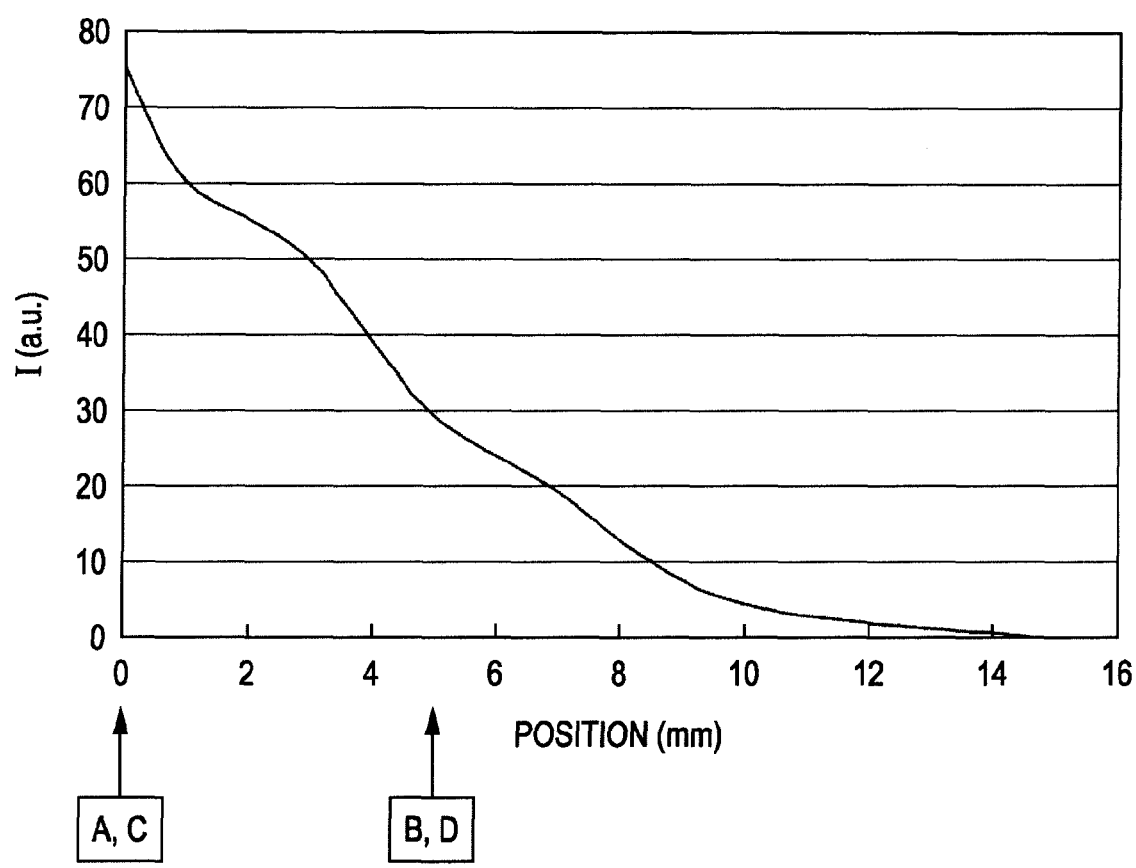
FIG. 20 is a graph of a sensitivity characteristic representing setting of a threshold value in a case where an image is changed to another image at the same imaging height.

In addition, as shown in schematic diagrams of FIGS. 19A and 19B and an example of setting a threshold value on the sensitivity curve shown in FIG. 20, for buttons having a same 3D display height Hf, it can be controlled that one button (button A) is changed into a 3D image, and the other button (button C) is maintained to be a 2D image.

5. Modified Example 1

Figure 21:
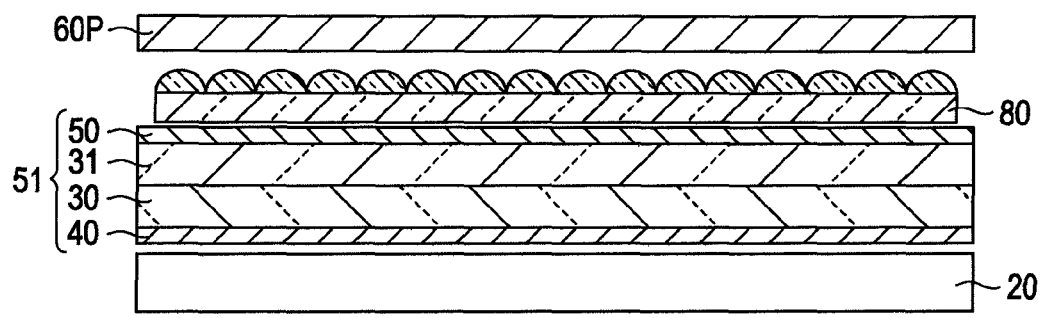
FIG. 21 is a schematic cross-sectional view representing Modified Example 1.

As shown in FIG. 21, for example, in a case where an externally attachable proximity sensor panel 60P is included, a lenticular lens 80 may be attached to the front surface of the liquid crystal panel (optical modulation panel 51), whereby implementing a stereoscopic display. On the further front side of the lenticular lens, a proximity sensor panel 60P of the electrostatic capacitor type is disposed.

Figure 22:
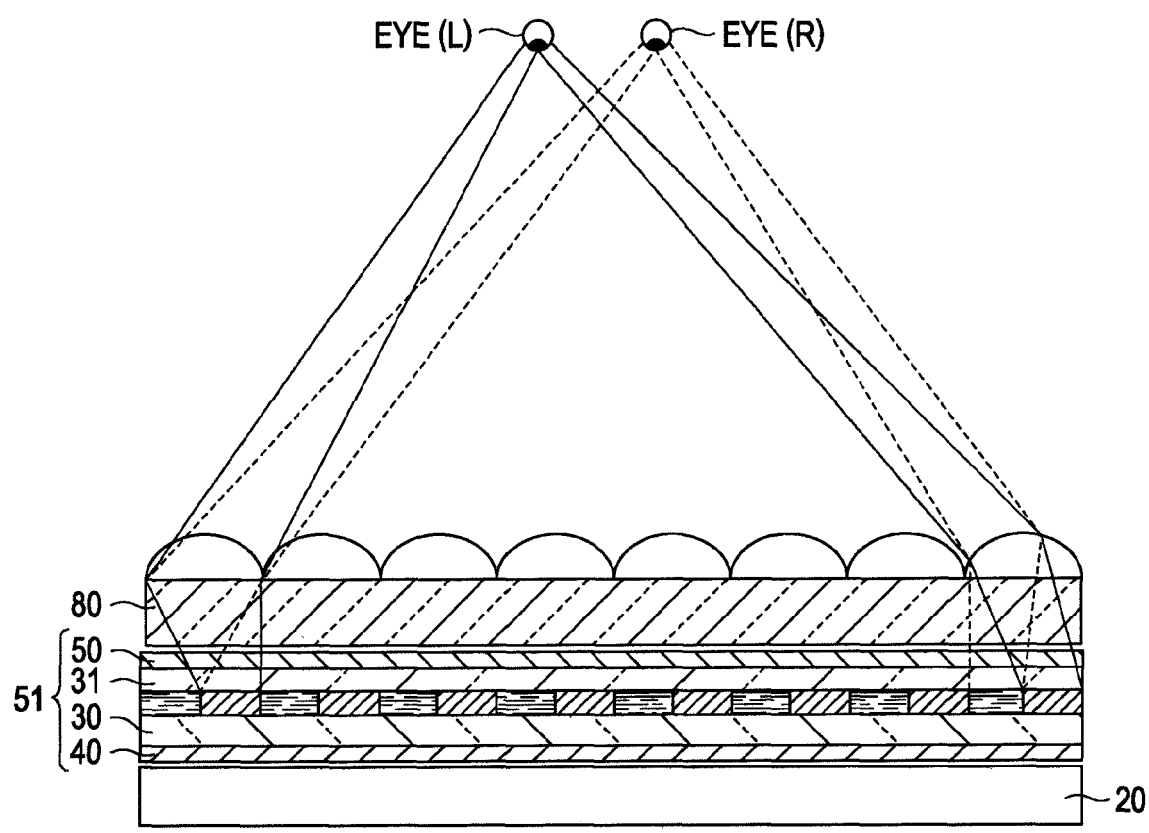
FIG. 22 is a cross-sectional view illustrating the reaction of Modified Example 1.

FIG. 22 shows a diagram representing the optical configuration of the lenticular lens and the liquid crystal display panel. As shown in FIG. 22, left and right images separately go into the right eye (R) and the left eye (L) through the lenticular lens 80, whereby the left and right images can be recognized as a stereoscopic image.

6. Modified Example 2

In the above-described first to fourth embodiments and Modified Example 1, in front of the image display panel, a stereoscopic image optical component, and a sensor are disposed, and accordingly, the image display panel is a liquid display panel. However, the image display panel may be an organic EL or a plasma display device.

7. Application of Present Invention for Electronic Apparatus

The stereoscopic image displaying device according to the above-described first to fourth embodiments can be applied to display devices of various electronic apparatuses in all the fields such as a digital camera, a notebook personal computer, a mobile terminal device including a cellular phone or the like, and a camcorder. Hereinafter, examples of the electronic apparatus to which this embodiment is applied will be described.

Figure 23:
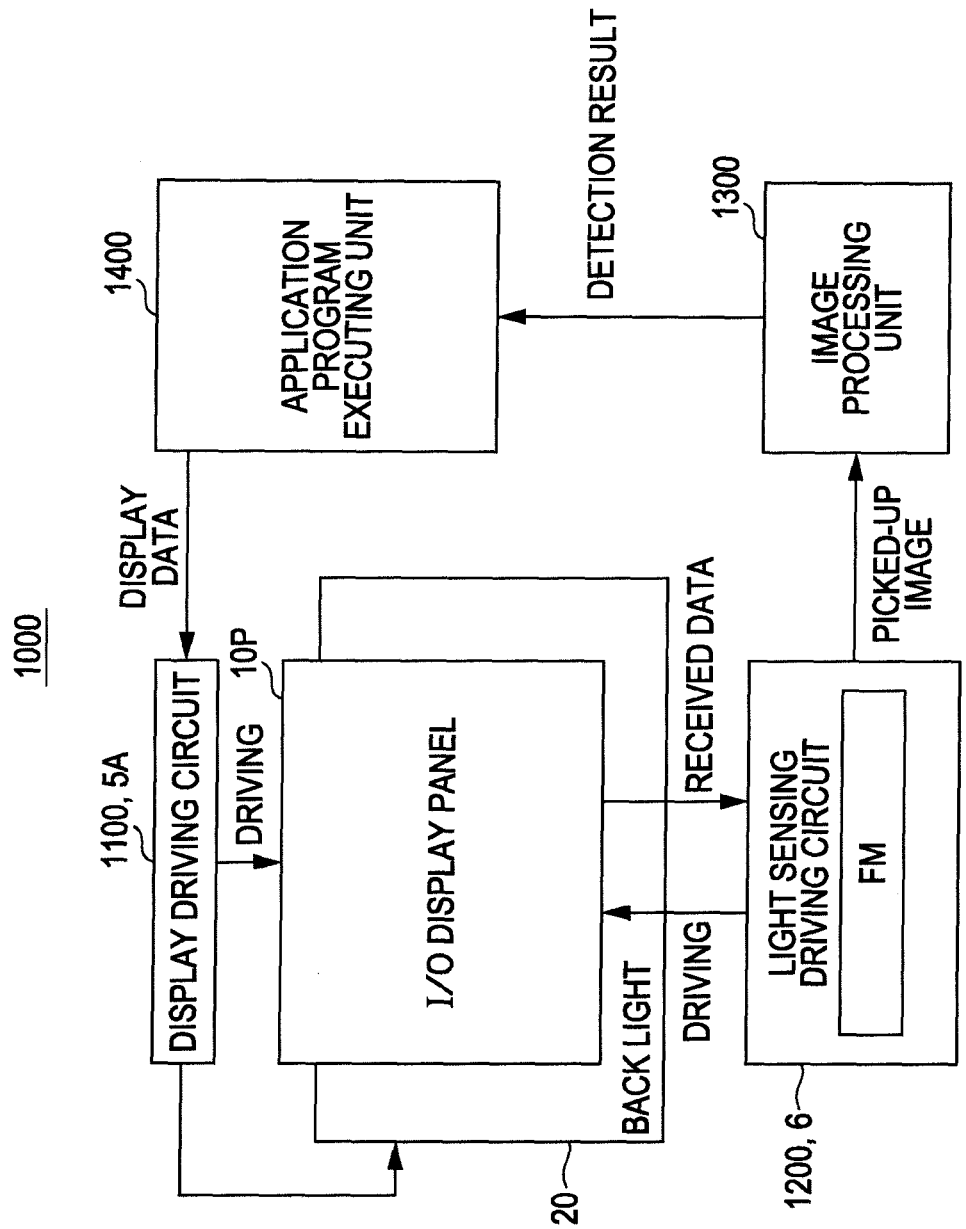
FIG. 23 is a block diagram showing the configuration of an electronic apparatus.

FIG. 23 is a block diagram showing the configuration of an electronic apparatus. The electronic apparatus 1000 shown in FIG. 23 has an I/O display panel (the display panel 10P), a back light 20, a display driving circuit 1100 (corresponding to the display driving circuit 5A), and a light sensing driving circuit 1200 (the detection determining unit 6). The above-described configuration is a configuration that is used in the above-described embodiments. In addition, the electronic apparatus 1000 further has an image processing unit 1300 and an application program executing unit 1400.

The I/O display panel (the display panel 10P) is configured by a liquid crystal panel (LCD (Liquid Crystal Display)) in which a plurality of pixels are disposed in a matrix pattern over the entire front surface. The I/O display panel has a function (display function) of displaying an image such as a specific graphic or character based on display data while performing a line-sequential operation. In addition, the I/O display panel has a function (photograph function) of photographing an object that is in contact with or in proximity to the outer surface 10S thereof.

The display driving circuit 1100 is a circuit that drives the I/O display panel (it drives a line-sequential operation) such that an image, which is based on the display data, is displayed on the I/O display panel (the display panel 10P).

The light sensing driving circuit 1200 is a circuit that detects and determines a detection target object such as a fingertip, so that light reception data can be acquired by the I/O display panel (the display panel 10P). While the display driving circuit 1100 drives the liquid crystal layer (the optical modulation layer) by driving pixels in a line-sequential manner, the light sensing driving circuit 1200 is a circuit that drives the sensor array in a line-sequential manner. In addition, the sensor output output from the sensor may be stored in a frame memory (FM), for example, in units of one frame so as to determine the size of the object or the like.

The image processing unit 1300 performs predetermined image processing (calculation process) based on a detection result or a detection image that is output from the light sensing driving circuit 1200. Accordingly, the image processing unit 1300 detects and acquires information (position and coordinates data, data on the shape or the size of an object, or the like) on an object that is in contact with or in proximity to the I/O display panel. The detection determining process has been described in the first and fourth embodiments, and thus the description thereof is omitted here.

The application program executing unit 1400 is a circuit that performs a process according to specific application software based on the detection result detected by the image processing unit 1300.

As the process according to application software, for example, there are switching between a 2D image and a 3D image, a process of increasing or decreasing the size of a display button in accordance with the result of height detection, a process of changing the button, and the like. In addition, by applying an embodiment of the present invention, operations at a plurality of heights can be detected. Accordingly, multiple-value information having the amount of information that is equal to or more than that of binary information including simple button conversion or the like can be input to the application software in accordance with the operation of a detection target object such as a fingertip at a specific level by dividing the height range into several levels. Therefore, an embodiment of the present invention can be applied to an operation of application software that controls the degree of an action, for example, in a game or the like in accordance with the height of the fingertip. In addition, in a simple example, the positional information (including the height) of a detection target object such as a fingertip is included in the display data, and there is a process of displaying the detection target object on the I/O display panel 10P as an example.

The display data generated by the application program executing unit 1400 is supplied to the display driving circuit 1100 together with the button display, the positional data, and the like.

Figure 24:
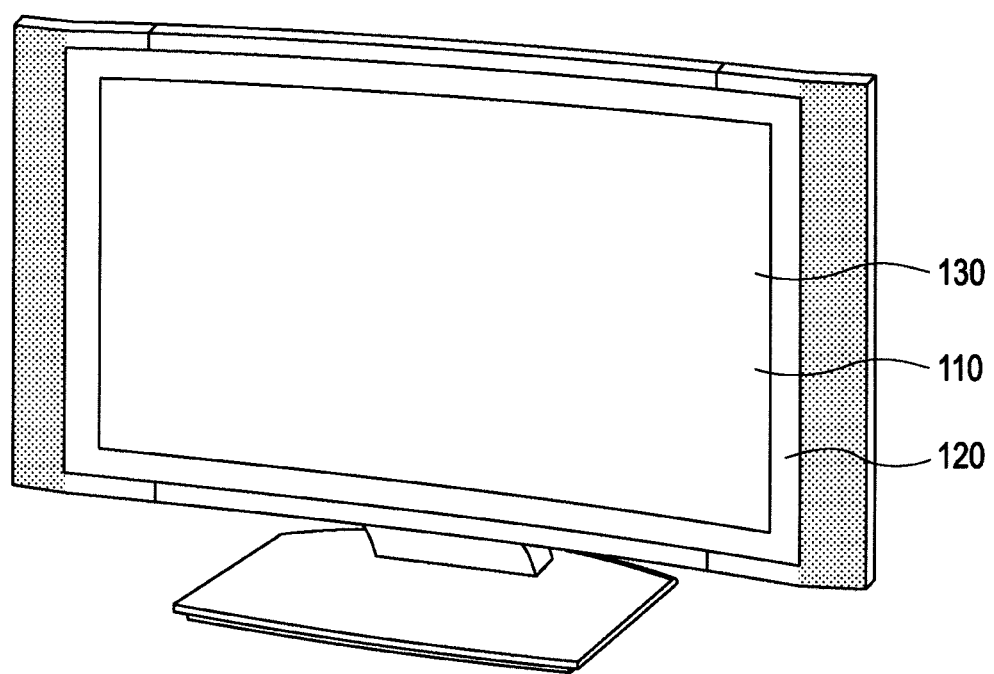
FIG. 24 is a perspective view of a TV set.

FIG. 24 is a perspective view showing a television set according to an embodiment of the present invention. The television set according to this application includes a video display screen unit 110 that is configured by a front panel 120, filter glass 130, and the like. As the video display screen unit 110, the stereoscopic image displaying device according to the second to fourth embodiments and the modified examples can be used.

Figure 25A:
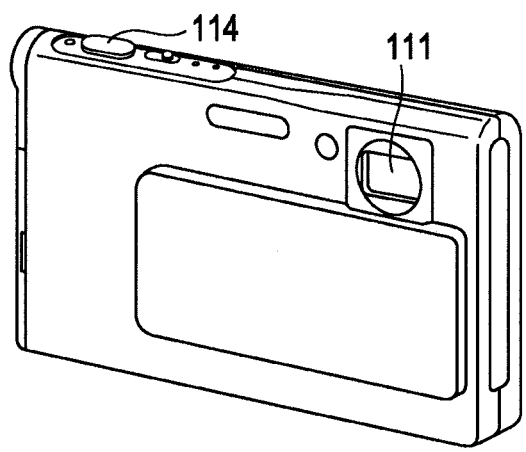
FIGS. 25A and 25B are perspective views of a digital camera.
Figure 25B:
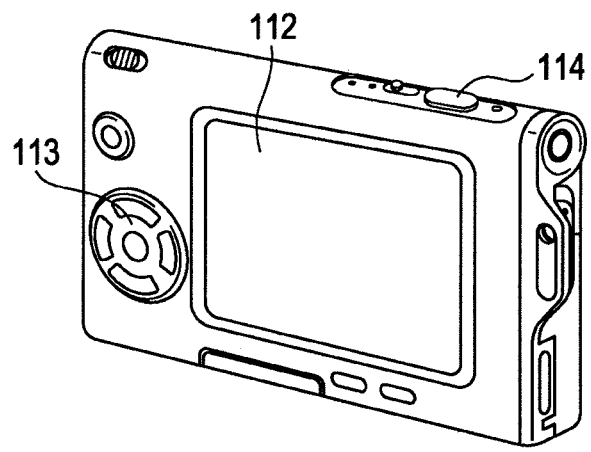

FIGS. 25A and 25B are perspective views showing a digital camera according to an embodiment of the present invention. FIG. 25A is a perspective view viewed from the front side, and FIG. 25B is a perspective view viewed from the rear side. The digital camera according to this application includes a light emitting unit 111 used for flashing, a display unit 112, a menu switch 113, a shutter button 114, and the like. As the display unit 112, the stereoscopic image displaying device according to the second to fourth embodiments and the modified examples can be used.

Figure 26:
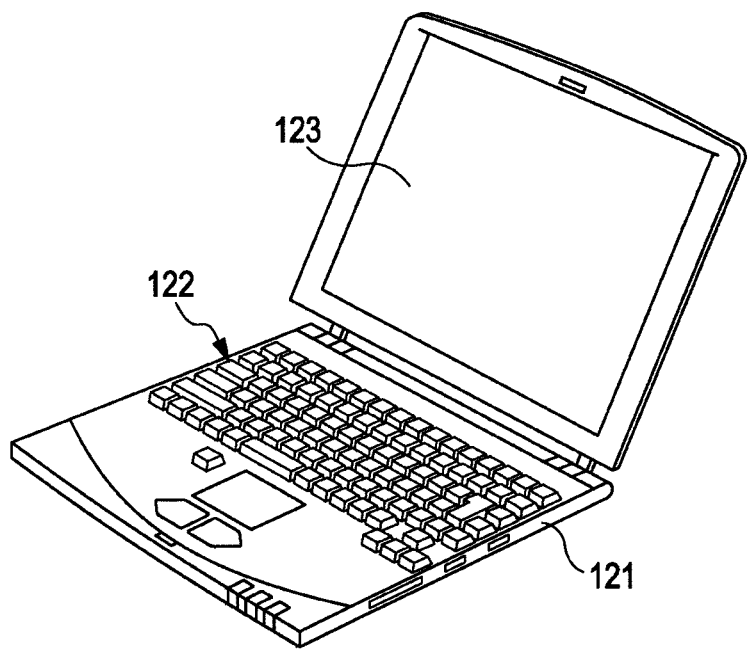
FIG. 26 is a perspective view of a notebook personal computer.

FIG. 26 is a perspective view showing a notebook personal computer according to an embodiment of the present invention. The notebook personal computer according to this application includes a main body 121, a keyboard 122 that is operated when a character or the like is input, a display unit 123 that displays an image, and the like. As the display unit 123, the stereoscopic image displaying device according to the second to fourth embodiments and the modified examples can be used.

Figure 27:
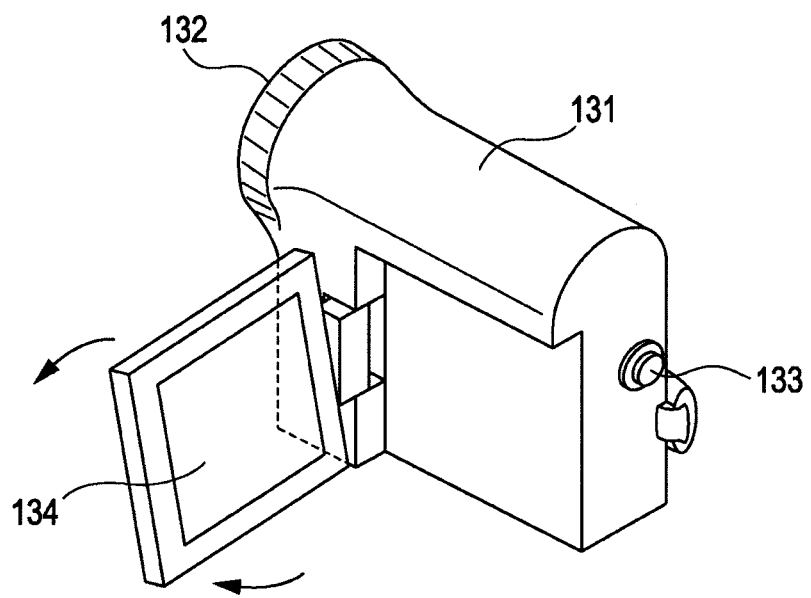
FIG. 27 is a perspective view of a video camera.

FIG. 27 is a perspective view showing a camcorder according to an embodiment of the present invention. The camcorder according to this application includes a main body unit 131, a lens 132, which is disposed on a side face facing the front side, for photographing a subject, a start/stop switch 133 used for photographing, a display unit 134, and the like. As the display unit 134, the stereoscopic image displaying device according to the second to fourth embodiments and the modified examples can be used.

FIGS. 28A to 28G are diagrams showing a mobile terminal device such as a cellular phone according to an embodiment of the present invention. FIG. 28A is a front view in an opened state, FIG. 28B is a side view, and FIG. 28C is a front view in a closed state. In addition, FIG. 28D is a left side view, FIG. 28E is a right side view, FIG. 28F is a top view, and FIG. 28G is a bottom view. The cellular phone according to this application includes an upper case 141, a lower case 142, a connection portion (here, a hinge portion) 143, a display 144, a sub display 145, a picture light 146, a camera 147, and the like. As the display 144 or the sub display 145, the stereoscopic image displaying device according to the second to fourth embodiments and the modified examples can be used.

As described above, in a sensor function-added stereoscopic image displaying device according to an embodiment of the present invention, by allowing a sensor to react in a position in which a stereoscopic image is imaged, even an information input unit as a stereoscopic image that is not actually a physical object can be reacted by relieving some dissatisfaction. In addition, since the size of the above-described stereoscopic image displaying device is not different much from a general touch panel-added liquid crystal display device, the stereoscopic image displaying device can be applied to a mobile device. In addition, the stereoscopic image displaying device can perform switching between a two-dimensional image and a three-dimensional image and can be used as an ordinary touch panel for an ordinary two-dimensional image.

In the description presented above, the stereoscopic display device has been mainly described. However, the description also applies to an object proximity detecting device according to an embodiment of the present invention. Here, the object proximity detecting device is different from the stereoscopic display device in that the configuration of the stereoscopic image generating unit, which is necessary in the stereoscopic display device, is arbitrary. In other words, the object proximity detecting device may be configured not to actually display a stereoscopic image, and parallax information is input to the object proximity detecting device. In addition, the object proximity detecting device, similarly to the stereoscopic display generating device, has a proximity sensor unit that detects the proximity of a detection target object to the outer surface at a distance (height) from the outer surface that is set based on the input parallax information.

The present application contains subject matter related to that disclosed in Japanese Priority Patent Application JP 2009-1555376 filed in the Japan Patent Office on Jun. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A stereoscopic image displaying device comprising:
   an outer surface that a detection target object approaches;
   a stereoscopic image display panel that generates a three-dimensional stereoscopic image based on an input video signal;
   a display control unit that controls the stereoscopic image display panel such that an image displaying height at which the stereoscopic image is generated can be changed according to parallax information included in the input video signal;
   a proximity sensor unit which has at least a portion that is disposed at a side of the outer surface and which detects, with a detection range in a direction of the image displaying height, proximity of the detection target object with respect to the outer surface, the detection range having an upper limit that is substantially the same as the image displaying height;
the proximity sensor unit including;
a plurality of driving electrodes that are separated in a first direction and are AC-driven; and
a plurality of detection electrodes that are separated in a second direction different from the first direction and that are disposed to face the driving electrodes, the detection electrodes being capacitively coupled with the driving electrodes and having electric potentials changing in accordance with proximity of the detection target object; and
a detection determining unit that determines detection of the detection target object based on an output signal output from the proximity sensor unit and which has a variable detection range;
wherein in a two dimensional display mode in which the two-dimensional display image is output from the outer surface, the driving electrodes are driven in an united manner;
wherein, in a three dimensional display mode in which the stereoscopic image is output from the outer surface, the driving electrodes of an electrode group are driven in a tied manner in a unit period, the electrodes group includes k (k is an integer of two or more) driving electrodes, which are adjacent in the first direction in the unit period, and which in the subsequent unit period, are shifted in the first direction by s (s is an integer that is equal to or greater than one and smaller then k) driving electrodes;
wherein the stereoscopic image display panel generates an image different from the stereoscopic image that is displayed when the detection determining unit determines detections of the detection target object, upon a timing before the detection target object comes into contact with the outer surface;
and wherein the stereoscopic image display panel generates a plurality of selectable three-dimensional stereoscopic images and a predetermined detection range is different for at least two of the stereoscopic images based on different parallax information for the selectable three-dimensional stereoscopic images.

2. The stereoscopic image displaying device according to claim 1, wherein the detection determining unit detects the detection target object by comparing the sensor output signal output from the proximity sensor unit with a threshold value and changes the detection range by gradually increasing the threshold value used for the detection from a minimum value within a predetermined range until the detection target object is detected.

3. The stereoscopic image displaying device according to claim 2, wherein the detection range is a detection range of a predetermined width having the threshold value as its upper limit and a lower limit value that is smaller than the threshold value by a predetermined value.

4. The stereoscopic image displaying device according to claim 1,
wherein the stereoscopic display panel unit includes:
an image generating section that generates a two-dimensional display image; and
the display control unit includes an optical component that controls transmitted light so as to generate the two-dimensional display image as a three-dimensional stereoscopic image at a side of the detection target object based on the parallax information of the video signal, and
wherein the display control unit has a function of switching between the three-dimensional image display mode and the two-dimensional image display mode in which the two-dimensional display image is output from the outer surface on an entire screen or in a part of the screen by controlling the optical component.

5. The stereoscopic. image displaying device according to claim 1, wherein the display control unit has a function of switching a part of or the entire screen in which detection is determined to another stereoscopic image displaying screen or a two-dimensional display screen when the detection of the detection target object is detected by the detection determining unit.

6. The stereoscopic image displaying device according to claim 1, wherein the detection determining unit, when the respective heights of the plurality of image portions are changed by the control of the display control unit, changes the detection range in the direction of the height that is used for the determination in accordance with the change in the heights.

7. The stereoscopic image displaying device according to claim 1,
wherein the stereoscopic image display panel includes:
an image generating section that generates a two-dimensional display image; and an optical component that controls transmitted light so as to generate the two-dimensional display image as a three-dimensional stereoscopic image side of the detection target object based on the parallax information of the video signal, and
wherein the optical component is a parallax barrier in which a parallax sub-barrier shielding light at a pitch corresponding to a magnitude of the parallax information and a slit that is an area through which light is transmitted between the parallax sub-barriers are alternately formed in a parallel stripe shape by the control of the display control unit.

8. The stereoscopic image displaying device according to claim 7, wherein the parallax barrier can switch a longitudinal direction of the sub-parallax barriers and the slits to one direction or to the other direction by the control of the display control unit.

9. The stereoscopic image displaying device according to claim 1, wherein the proximity sensor unit, an optical modulation panel that is disposed as the stereoscopic image display panel and modulates transmitted light in accordance with the video signal, and a back light that emits light onto the optical modulation panel are sequentially disposed from a side close to the outer surface that is opposite to the side that the detection target object approaches.

10. The stereoscopic image displaying device according to claim 9,
wherein the stereoscopic image display panel includes:
an image generating section that generates a two-dimensional display image; and an optical component that controls transmitted light so as to generate a three-dimensional stereoscopic image at a side of the detection target object based on the parallax information of the video signal,
wherein the optical component is disposed between the optical modulation panel and the back light.

11. The stereoscopic image displaying device according to claim 1,
wherein the plurality of driving electrodes are additionally used as common electrodes that apply voltages to a liquid crystal layer, the liquid crystal layer modulates transmitted light in accordance with the video signal inside the stereoscopic image display panel, by using electric potential differences between pixel electrodes of each pixel and the driving electrodes.

12. The stereoscopic image displaying device according to claim 1,
wherein the stereoscopic image display panel is disposed on a side of the outer surface that is opposite to the side that the detection target object approaches, and
wherein the proximity sensor unit has an optical sensor array in which optical sensors that are disposed inside the stereoscopic image display panel and receive reflective light generated by reflecting image light output from the stereoscopic image display panel from the detection target object are two-dimensionally disposed on a face facing the outer surface.

13. An electronic apparatus having a display comprising:
an outer surface that a detection target object approaches;
a stereoscopic image display panel that generates a three-dimensional stereoscopic image based on an input video signal;
a display control unit that controls the stereoscopic image display panel such that an image displaying height at which the stereoscopic image is generated can be changed according to parallax information included in the input video signal;
a proximity sensor unit which has at least a portion that is disposed at a side of the outer surface and which detects, with a detection range in a direction of the image displaying height, proximity of the detection target object with respect to the outer surface, the detection range having an upper limit that is substantially the same as the image displaying height;
the proximity sensor unit including;
a plurality of driving electrodes that are separated in a first direction and are AC-driven; and
a plurality of detection electrodes that are separated in a second direction different from the first direction and that are disposed to face the driving electrodes, the detection electrodes being capacitively coupled with the driving electrodes and having electric potentials changing in accordance with proximity of the detection target object;
an image processing unit that changes the video signal input to the stereoscopic image display panel based on a detection result of the proximity sensor unit;
and
a detection determining unit that determines detection of the detection target object based on an output signal output from the proximity sensor u pit and which has a variable detection range;
wherein in a two-dimensional display mode in which the two-dimensional display image is output from the outer surface, the driving electrodes are driven in an untied manner;
wherein, in a three-dimensional display mode in which the stereoscopic image is output from the outer surface, the driving electrodes of an electrodes group are driven in a tied manner in a unit period, the electrode group includes k (k is an integer of two or more) driving electrodes, which are adjacent in the first direction in the unit period, and which subsequent unit period, are shifted in the first direction by s (s is an integer that is equal to or greater than one and smaller then k) driving electrodes;
wherein the stereoscopic image display panel generates an image different from the stereoscopic image that is displayed when the detection determining unit determines detections of the detection target object, upon a timing before the detection target object comes into contact with the outer surface;
and wherein the stereoscopic image display panel generates a plurality of selectable three-dimensional stereoscopic images and a predetermined detection range is different for at least two of the stereoscopic images based on different parallax information for the selectable three-dimensional stereoscopic images.

14. The stereoscopic image displaying device according to claim 1, wherein, when the detection determining unit determines detection of the detection target object while the stereoscopic image is being generated, a three-dimensional representation of a user selection is changed to a two-dimensional representation of the selection.

15. The stereoscopic image displaying device according to claim 1, and further wherein, upon selection by a user, the selected three-dimensional stereoscopic image is replaced with a two-dimensional image presentation on the image display panel at a location corresponding to the selected three-dimensional stereoscopic image to reflect user selection.

* * * * *